US009495714B2

(12) United States Patent
Bush et al.

(10) Patent No.: US 9,495,714 B2
(45) Date of Patent: Nov. 15, 2016

(54) IMPLEMENTING MENU PAGES IN A SOCIAL NETWORKING SYSTEM

(71) Applicant: Facebook, Inc., Menlo Park, CA (US)

(72) Inventors: Matthew Bush, San Francisco, CA (US); Russell Heddleston, San Francisco, CA (US); Brian Pantano, New York, NY (US)

(73) Assignee: FACEBOOK, INC., Menlo Park, CA (US)

( * ) Notice: Subject to any disclaimer, the term of this patent is extended or adjusted under 35 U.S.C. 154(b) by 278 days.

(21) Appl. No.: 13/691,468

(22) Filed: Nov. 30, 2012

(65) Prior Publication Data

US 2014/0157145 A1 Jun. 5, 2014

(51) Int. Cl.
*G06F 3/00* (2006.01)
*G06Q 50/00* (2012.01)

(52) U.S. Cl.
CPC .................................... *G06Q 50/01* (2013.01)

(58) Field of Classification Search
CPC .... G06Q 50/01; G06Q 30/02; G06F 9/4443; G06F 3/0481; G06F 17/30867; G06F 17/3089; H04N 7/15; H04L 12/1813; H04L 12/581
USPC .................................................. 715/745, 753
See application file for complete search history.

(56) References Cited

U.S. PATENT DOCUMENTS 8,763,152 B2 * 6/2014 Vernal et al. .................. 726/28
8,832,093 B2 * 9/2014 Redstone et al. ............. 707/724
2006/0287910 A1 * 12/2006 Kuchar .................. G06Q 99/00 706/16
2008/0040474 A1 * 2/2008 Zuckerberg et al. ......... 709/224
2009/0012965 A1 * 1/2009 Franken .......................... 707/10
2009/0119167 A1 * 5/2009 Kendall et al. ................. 705/14
2010/0030578 A1 * 2/2010 Siddique ............ G06Q 10/0637 705/3
2011/0260860 A1 * 10/2011 Gupta ...................... 340/539.13
2011/0265011 A1 * 10/2011 Taylor .................... G06Q 50/01 715/751
2012/0046992 A1 * 2/2012 Hu ......................... G06Q 30/02 705/7.29
2012/0185486 A1 * 7/2012 Voigt et al. ................... 707/741
2012/0290433 A1 * 11/2012 England et al. ............. 705/26.7
2013/0018964 A1 * 1/2013 Osipkov et al. .............. 709/206
2013/0117675 A1 * 5/2013 Twig et al. ................... 715/737
2013/0173398 A1 * 7/2013 Wang et al. ............... 705/14.73
2013/0290820 A1 * 10/2013 Dhanani ....................... 715/205
2013/0290905 A1 * 10/2013 LuVogt et al. ................ 715/835
2013/0332593 A1 * 12/2013 Patnaikuni ........ H04L 29/06884 709/224
2014/0067964 A1 * 3/2014 Grishaver ............. G06Q 50/01 709/206
2014/0075307 A1 * 3/2014 Bargas et al. ................. 715/716
2014/0129317 A1 * 5/2014 Grishaver .......... G06Q 30/0255 705/14.39
2014/0149507 A1 * 5/2014 Redfern .................. H04L 65/00 709/204

* cited by examiner

*Primary Examiner* — Doon Chow
*Assistant Examiner* — Shourjo Dasgupta
(74) *Attorney, Agent, or Firm* — Perkins Coie LLP

(57) ABSTRACT

A social networking system can generate or utilize a social menu in a social network page. The social menu can be generated based on a crowd-sourced user interaction, an external database of business offerings, an administrator interface of the social network page, or any combination thereof. A user interaction of one user account with a menu item of a social menu can be presented to another user account. A user account can select the menu item by querying the social networking system for creating a reference link to the menu item.

19 Claims, 18 Drawing Sheets

IMPLEMENTING MENU PAGES IN A SOCIAL NETWORKING SYSTEM

FIELD OF INVENTION

This invention relates generally to a social networking system, and in particular to providing a social listing of products or services in a social networking system.

BACKGROUND

Social networking systems commonly provide mechanisms allowing users to interact within their social networks. A social networking system user may be an individual or any other entity, such as a business or other non-person entity. A variety of relationships can be monitored within a social networking system, including connections amongst the users and social objects within the social networking system, such as between a user to another user, between a user to a social object, and between a social object to another social object. A social object may be, for example, one or more of a social networking system user, a non-person entity, a content item, a group, a social network page, an event, a message, a subject (such as persons, places, things, abstract ideas or concepts), a multimedia, or any combination thereof.

One category of a relationship monitored by the social networking system is a page connection. The page connection is a connection between a user account and a social network page. The social network page is a portal for an entity to interact with the social networking system users. The social network page can represent an entity, a brand, an individual, a business, a group, an organization, or any combination of. The page connection can be used in advertisement, news feed, data collection, and a variety of other tasks. The social network page made with traditional systems is often entirely managed by an administrator of that social network page. The multimedia contents of the social network page are individually labeled by the poster of the multimedia contents with no relation to other multimedia contents of the past. This type of content management for the social network page may limit the richness of interactivity presented and captured through the social networking system. The complexity of the social network page is often discouraged by the need for simplicity of user experience. Thus there is a need for a solution that provides a more enjoyable and useful experience to social networking system users in regards to a social network page.

SUMMARY

Embodiments of this disclosure generate and utilize social menus in a social network page. Social menus are content structures for organizing a listing of relevant items and objects associated with the social network page or a brand represented by the social network page. The social menus each include a set of menu items. The listing can include offerings of physical goods, real or movable property, services, virtual goods, virtual services, virtual property, or any combination thereof. For example, the social menus can be catalogues, restaurant menus, service listing, movie selection, or any combination thereof.

The social network page, the social menus, and the menu items are structured data within a social graph of a social networking system. The concept of the social graph is further explained below.

The social menus and the social network page can be displayed off of the social networking system. The social menus can be displayed via an Application Programming Interface (API), a social plug-ins or iFrames. Third-party developers may enable users of the social networking system to express interest in web pages, social menus, or menu items hosted on websites external to the social network system. These web pages, social menus, or menu items may be represented as objects in a social graph of the social networking system as a result of embedding a widget, a social plug-in, programmable logic or code snippet into the web pages of the external websites, such as an iFrame. As a result, users may interact with the social menus and the menu items external to the social network system that are relevant to a keyword or keyword phrase, such as "Beef Taco" or "Dinner Menu." Each of the interactions with an object, such as a menu item, may be recorded by the social network system as an edge. Enabling third-party developers to define custom object types and custom action types, is further described in a related application, "Structured Objects and Actions on a Social Networking System," U.S. application Ser. No. 13/239,340 filed on Sep. 21, 2011, which is hereby incorporated by reference. Defining custom object types can include defining custom menu items and social menus. Defining custom action types can include defining custom activities that the user accounts can claim to have with a menu item, such as "drinking", "eating", "buying", or "watching" a menu item.

The social menus can be generated from the administrator of the social network page. The social menus can also be generated by importing a database of goods and services offered by real-world entities, where the entities can be correlated with existing social network pages. For example, the database of goods and services can include YELP™, WIKIPEDIA, OPENTABLE, SINGLEPLATFORM™, other digitized menu pages, or any combination thereof. In some embodiments, all or parts of the social menus can be generated by crowd sourcing, such as by querying users about particular menu items that they have interacted with.

Each social network page can have multiple social menus. Social network pages can share a single social menu. Each social menu can have multiple sub-menus or sections. Each menu or sub-menu can have multiple menu items. Each menu item can have different specific variants, such as flavor, color, size, etc. The social menus and the menu items have menu pages and item pages, respectively. Each of the menu pages or the item pages can include a name, a profile representation (e.g. a profile picture), a description, a price, a social context, other relevant information, or any combination thereof. Each of the social menu, the sub-menu, and menu item are objects represented by structured data in the social networking system described in the Social Networking System Overview section below.

The social menus are integrated throughout the social networking system. A type-ahead module allows a user to quickly search for social menus and social menu items that are relevant to the user. The relevancy of the social menu can be determined by an explicit report from a user account of the user, such as a check-in into a restaurant page or other place page. The relevancy can also be determine by an external report, such a tag or a mention of the user account to the social network page or the social menu by a friend account of the user account. Further, the relevancy can be determined by other indirect data, such as a GPS location of a user device accessing the user account or a known location of an event the user account is participating in.

Although it has been illustrated as examples in the figures and the detailed description that the social menus are provided for the social network page, it is within the scope of this invention that the social menu can be used with other entities within the social graph. For example, a user account can also have a social menu for providing offerings of an individual user. The individual user can be associated with a social menu. The profile of the individual user can include the social menu. The social menu of the individual user can include a listing of items or objects offered by the individual user. For example, the social menu of the individual user can be a list of used items for sale or a list of contracting services provided by the individual user.

The social networking system disclosed herein may promote specific user interactions with the social menus and the menu items in the social network page based on the disclosed mechanisms. The social networking system further captures additional information about interactions between users and specific menu items of the social network page. For example, the social network page structures a record of interactions around a common menu item that relates to each of the interactions. Accordingly, embodiments of the invention are discovered to improve upon the social interaction analytics technology of social networking systems and improve the customization of businesses having a social network page.

Some embodiments have other aspects, elements, features, and steps in addition to or in place of what is described above. These potential additions and replacements are described throughout the rest of the specification

Figure 1:
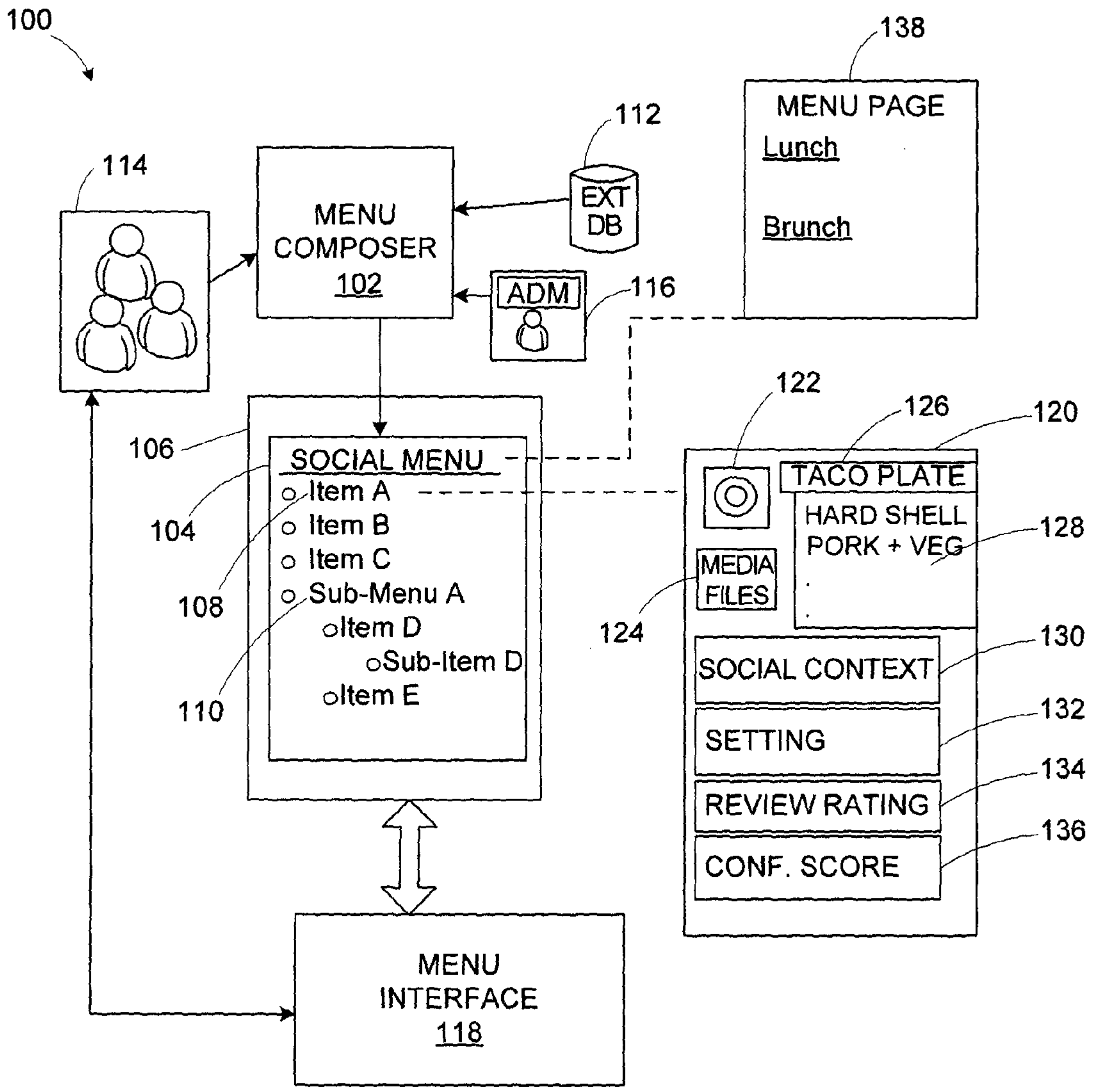
FIG. 1 is an illustration of a social networking system with a mechanism to generate and modify social menus.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Social Networking System Overview

Social networking systems commonly provide mechanisms allowing users to interact with objects and other users both within and external to the context of the social networking system. A social networking system user may be an individual or any other entity, such as a business or other non-person entity. The social networking system may utilize a web-based interface comprising a series of inter-connected pages displaying and allowing users to interact with social networking system objects and information. For example, a social networking system may display a page for each social networking system user comprising objects and information entered by or related to the social networking system user (e.g., the user's "profile"). Social networking systems may also contain pages containing pictures or videos, dedicated to concepts, dedicated to users with similar interests ("groups"), or containing communications or social networking system activity to, from or by other users. Social network pages may contain links to other social network pages, and may include additional capabilities such as search, real-time communication, content-item uploading, purchasing, advertising, and any other web-based technology or ability. It should be noted that a social networking system interface may be accessible from a web browser or a non-web browser application, such as a dedicated social networking system mobile device or computer application. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph includes a set of nodes (representing social networking system objects, also known as social objects) interconnected by edges (representing interactions, activity, or relatedness). In some embodiments, the edges can be represented as bi-directional. In other embodiments, the edges can be represented as directional. For example, a user node checking into a social network page for a place, can be represented by either a bi-directional edge between the user node and the social network page or a directional edge from the user node to the social network page. In some embodiments, the social graph can be stored separately for user interactions of a specific kind. In other embodiments, the social networking system stores the social graph without discriminating the type of user interactions.

A social networking system object may be a social networking system user, nonperson entity, content item, group, social network page, a social menu, a sub-menu of the social menu, a menu item in the social menu, location, application, subject, concept or other social networking system object, such as a movie, a band, or a book. Content items include anything that a social networking system user or other object may create, upload, edit, or interact with, such as messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or abstract idea.

A social networking system may allow a user to enter and display information related to the user's interests, education and work experience, contact information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may allow a user to upload or create pictures, videos, documents, songs, or other content items, and may allow a user to create and schedule events. Content items and events may be represented by nodes in the social graph.

A social networking system may provide a variety of means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

Social networking systems allow users to associate themselves and establish connections with other users of the social networking system. When two users explicitly establish a connection in the social networking system, they become "friends" (or, "connections") within the context of the social networking system. Being friends in a social networking system may allow users access to more information about each other than would otherwise be available to unconnected users. For instance, being friends may allow a user to view another user's profile, to see another user's friends, or to view pictures of another user. Likewise, becoming friends within a social networking system may allow a user greater access to communicate with another user, such as by email (internal and external to the social networking system), instant message, text message, phone, or any other communicative interface. Finally, being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected for the purposes of determining social context for use in determining the topic of communications. In one embodiment, users who belong to a common network are considered connected. For example, users who attend a common school, work for a common company, or belong to a common social networking system group may be considered connected. In one embodiment, users with common biographical characteristics are considered connected. For example, the geographic region users were born in or live in, the age of users, the gender of users and the relationship status of users may be used to determine whether users are connected. In one embodiment, users with common interests are considered connected. For example, users' movie preferences, music preferences, political views, religious views, or any other interest may be used to determine whether users are connected. In one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with a particular user in order to determine or evaluate the social context of the communications of the particular user.

In one embodiment, the social network system can compute affinity scores for users' interests either explicitly expressed or otherwise inferred on the social network system and use these affinity scores to establish additional connections in the social network system, such as in ranking new menu items that will be published in news feeds or other communication channels on the social network system. Affinity scoring with coefficients are further discussed in "Contextually Relevant Affinity Prediction in a Social Networking System," U.S. application Ser. No. 12/978,265, filed on Dec. 23, 2010, and "Top Friend Prediction for Users in a Social Networking System," U.S. application Ser. No. 13/093,744, filed on Apr. 25, 2011, which are both incorporated by reference.

A social networking system may provide a variety of communication channels to users. For example, a social networking system may allow a user to email, instant message, or text/SMS message, one or more other users; may allow a user to post a message to the user's wall or profile or another user's wall or profile; may allow a user to post a message to a group or a fan page; or may allow a user to comment on an image, wall post or other content item created or uploaded by the user or another user. In one embodiment, a user posts a status message to the user's profile indicating a current event, state of mind, thought, feeling, activity, or any other present-time relevant communication. A social networking system may allow users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, such as content items uploaded by the second user.

The social networking system can include a social menu in a social network page. The social menu is defined as a content structure for organizing a listing of relevant items and objects associated with the social network page or a brand represented by the social network page. Each of the relevant item or object is a menu item. The listing can include physical goods, real or movable property, services, virtual goods, virtual services, virtual property, or any combination thereof. The social menu and the menu items can be displayed or accessed by a third-party website. A listing of the relevant items and objects on a third-party website can correspond to the menu items on the social networking system via a social plug-in, iFrame, or an application programming interface of the social networking system as described in the applications incorporated by reference above. For example, the social menus can be catalogues, restaurant menus, service listing, movie selection, or any combination thereof. A menu item is defined as a content entry within the social menu for a specific item offered by the social network page. The menu item is a structured data associated with an object in the social graph of the social networking system. The structured data can be stored as a node in the social graph and connections with the structured data can be stored as an edge in the social graph.

Referring now to FIG. 1, therein is shown an illustration of a social networking system 100 with a mechanism to generate and modify social menus. The social networking system 100 can be a social networking system as described in the overview.

The social networking system 100 can include a menu composer module 102 that operates within the social networking system 100 to generate a social menu 104. The social menu 104 can reside within a social network page 106. The social menu 104 can also be shared between several social network pages. For example, for a franchise business, a social network page for a San Francisco location can share the social menu 104 with a social network page for a Denver location.

Particularly, if two social network pages share the social menu 104, they can still have different menu item details. For example, the social menu 104 for the San Francisco location may have different prices for their menu items compared to the Denver location. For another example, the San Francisco location may have specific menu items or menu item variants that are not available in the Denver location. In at least one embodiment, for the menu items that are shared, even if the prices differ, the social context of the shared social menu and/or the menu items are also shared. Social context can include a number of people who has interacted with the shared menu items, a number of people who have liked the shared menu items, or other social context derived from user interactions with the shared menu items.

The social network page 106 can be the social network page as described in the overview. The social menu 104 can include a menu item 108. The menu item 108 is an individual entry of an item or object associated with the social network page 106. The social menu 104 can also include a sub-menu 110. The sub-menu 110 is a structured data on the social graph representing a section of the social menu 104 that contains one or more menu items in a category designated by an administrator of the social network page 106. The sub-menu 110 can also include another sub-menu. For example, the sub-menu 110 can be a sub-menu section for a lunch menu at a restaurant or a sub-menu section for a spring-time menu at a restaurant. The sub-menu 110 can also be, for example, an appetizer menu or a desserts menu. The menu item 108 can include different variants as well. The variants can either be listed as different menu item, or can be a sub-category of the same menu item. For example, if the menu item 108 is a pair of jeans, different sizes or colors of the pair of jeans can be considered a variant of the menu item 108.

For illustrative purposes, the social menu 104 is referred to as a menu for restaurants, but it is understood that the social menu 104 is applicable for any type of social network pages, such as a product store, a service provider, a distributor, an event, or a marketplace, where the social menu 104 can be a catalogue, a service listing, a products listing, a booth listing, a goods listing, or any combination thereof.

The menu composer module 102 can generate the social menu 104 from an external database 112, an administrator interface 114, user accounts 116, or any combination thereof. The external database 112 is a database store having records of business offerings by an entity having offerings available to others. As a specific example, the external database 112 can be Single Platform™, an online offering listing for businesses. The menu composer module 102 can import the online offering listing to create the social menu 104. Each particular business in the external database 112 is correlated with known social network pages to identify the social network page 106 that represents the particular business.

The social menu 104 can be a brand new social menu or can be an existing social menu that is supplemented by the external database 112. In the case that the social menu 104 is the brand new social menu, each offering listed by the external database 112 for the particular business is added to the social menu 104 as a menu item, such as the menu item 108. In the case that the social menu 104 is the existing social menu, each offering is determined to correspond to an existing menu item, such as the menu item 108. The description and profile of the offering is then added to the menu item 108.

The social menu 104 can be generated by the administrator interface 114. The administrator interface 114 is used by an administrator account, which is a user account in the social networking system 100 with administrative rights to configure the social network page 106. The administrator interface 114 via the social networking system 100 can configure the social network page 106 including creating one or more social menus for the social network page 106. Aside from generating the social menus of the social network page 106, the administrator interface 114 allows the configuration of existing social menus, such as the social menu 104. For example, the structural layout of the social menu 104, including listing of the menu items and layers of sub-menus can be configured through the administrator interface 114. The administrator interface 114 can be accessed through an application programming interface (API), such that other computer software modules or hardware modules can interface with the administrator interface 114 to create or modify the social menu 104.

The social menu 104 can also be generated by crowd-sourcing the user accounts 116. The user accounts 116 are nodes on the social graph of the social networking system 100. The user accounts 116 can interact with the social network page 106 through the social networking system 100. User interactions received at the social networking system 100 can trigger the menu composer module 102 to query one of the user accounts 116 regarding which menu item that the one user account has interacted with. These user interactions can include check-ins and tagging of the one user account to the social network page 106. The one user account can respond back with a menu item name. When the menu item name is not recognized, the user account has the option of creating the menu item for the social network page 106.

Once the social menu 104 is generated, the social menu 104 can be utilized by the user accounts 116 on the social networking system 100. The social menu 104 can be a node or a sub-node on the social graph described in the overview. Interactions between the user accounts 116 and the social menu 104 can be communicated and managed through a menu interface module 118.

The menu interface module 118 can help the user accounts 116 identify which menu items the user accounts 116 are interacting with and how the user accounts 116 are interacting with the menu items. For example, the user accounts 116 can claim to "eat", "drink", "watch", "buy" or "listen" to any of the menu items in the social menu 104. In a specific example, as part of a check-in, a user account for a user "Matt" can claim that he is "eating nachos" at "Teddy's Nacho Royale," where nachos is a menu item and Teddy's Nacho Royale is a social network page with a social menu.

The menu item 108 is represented by an item page 120 on the social graph of the social networking system 100. The item page 120 can include a profile representation 122, multimedia files 124, a profile name 126, a profile description 128, a social context 130, a configuration setting 132, a review rating 134, an authenticity confidence score 136, or any combination thereof. The item page 120 can include other additional information or reference links to information relating to the menu item 108, the social menu 104, the social network page 106, or any combination thereof.

The profile representation 122 is a multimedia file representative of the menu item 108, such as a profile picture. It is understood that the profile representation 122 can not only be a still picture, but can also be an animated video clip, an interactive media, a logo, a word, or a phrase. The profile representation 122 can be selected by the administrator account through the administrator interface 114. The profile representation 122 can also be selected automatically by the menu composer module 102 from a bank of the multimedia files 124 uploaded by the user accounts 116. For example, based on a number of metrics measuring interactions with the multimedia files 124 of the menu item 108, one of the multimedia files 124 can be selected as the profile representation 122. The metrics can be weighted, giving more weight to certain social interactions such as "likes" and "recommendations".

The multimedia files 124 are multimedia files uploaded by the administrator account or the user accounts 116 tagging the menu item 108. The multimedia files 124 can be picture files, video files, audio files, interactive media files, application widget, phrases, or any combination thereof. The user accounts 116 can explicitly tag what activity is captured in the uploaded multimedia files 124, such as that a user account is "eating" or "drinking" the menu item 108 in an uploaded photograph.

The profile name 126 is a title of the menu item 108. The profile name 126 is generated when the menu item 108 is generated, either through the administrator interface 114, the user accounts 116, or the external database 112. The profile name 126 can be used by the menu interface module 118 to refer to the menu item 108, such as when a user account is making a reference to the menu item 108. The profile description 128 is a description of the menu item 108, including at least a textual description.

The social context 130 is an indication of social activities around the menu item 108. The social context 130 can be an interaction history with the menu item 108 by the user accounts 116. For example, the social context 130 can be a count of and references to user accounts who have "liked" the menu item 108, a count of and references to user accounts who have posted comments about the menu item 108, a count of and references to user accounts who have recommended the menu item 108, a count of and references to user accounts who have posted at least one of the multimedia files 124 for the menu item 108, or any combination thereof.

The configuration setting 132 is a set of configuration parameters established through the administrator interface 114. The configuration setting 132 is only visible to the user accounts with administrator privileges to the social menu 104 or the social network page 106, such as the administrator account. The configuration setting 132 can include a restriction of who can see the menu item 108, whether the menu item 108 is listed in the social menu 104 of the social network page 106, whether the user accounts 116 have the privilege to add to the multimedia files 124 and make other changes to the menu item 108, or any combination thereof. The configuration setting 132 can include an indication of what kind of direct interaction user accounts can have with the menu item 108. For example, the configuration setting 132 can indicate that the menu item 108 is a food item to be consumed, that the menu item 108 is a beverage item for drinking, that the menu item 108 is a food item for eating, or that the menu item 108 is a movie to be watched.

The review rating 134 is a crowd-sourced indication of the popularity or the quality of the menu item 108. For example, the review rating 134 can be determined based on the count of how many user accounts recommended the menu item 108, the count of how many user accounts "liked" the menu item 108, or any combination thereof.

The authenticity confidence score 136 is a system indication of how likely a crowd-sourced addition to the social menu 104, such as the menu item 108, is an authentic menu item for the social network page 106. If the menu item 108 is established by the administrator interface 114, then the authenticity confidence score 136 is at its highest. If the menu item 108 is established by the user accounts 116 or the external database 112, then the authenticity confidence score 136 may be based on a variety of factors. These factors include a number of tags to the menu item 108, a number of user accounts who have tagged the menu item 108 at least once, a number of "mark as spam" events on the menu item 108, a number of positive interactions with the menu item 108 including "likes", recommends, comments and shares, a number of menu item tags for the social network page 106, a number of menu items marked as spam for the social network page 106, or any combination thereof. The authenticity confidence score 136 can be used by a filter module to remove menu items from the social menu 104 as described further below.

The social menu 104 is represented by a menu page 138. The menu page 138 can have all of the same contents as the item page 120, except instead of referring to the menu item 108, the contents of the menu page 138 would refer to the social menu 104 as a whole.

Figure 2:
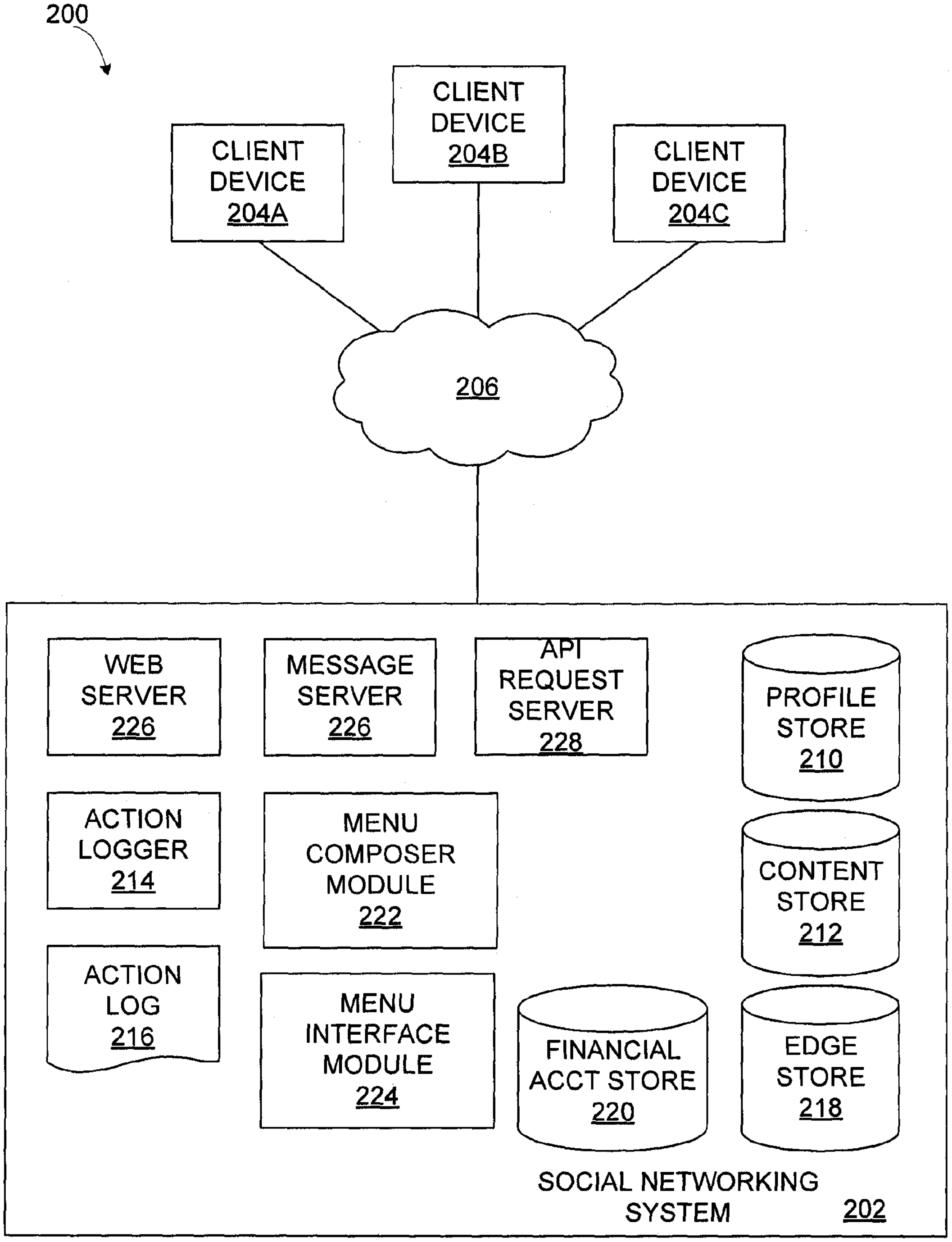
FIG. 2 is a high level block diagram of a system environment suitable for a social networking system, according to one embodiment.

Referring now to FIG. 2, therein is shown a high level block diagram of a system environment 200 suitable for a social networking system 202, according to one embodiment.

The system environment 200 shown in FIG. 2 includes the social networking system 202, a client device 204A, and a network channel 206. The system environment 200 can include other client devices as well, such as a client device 204B and a client device 204C. In other embodiments, the system environment 200 may include different and/or additional components than those shown by FIG. 2. The social networking system 202 can be the social networking system 100 of FIG. 1.

Social Networking System Environment and Architecture

The social networking system 202 comprises one or more computing devices storing user profiles associated with users and/or other objects as well as connections between users and other users and/or objects. In use, users join the social networking system 202 and then add connections to other users or objects of the social networking system to which they desire to be connected. Users of the social networking system 202 may be individuals or entities such as businesses, organizations, universities, manufacturers. The social networking system 202 allows its users to interact with each other as well as with other objects maintained by the social networking system 202. In some embodiments, the social networking system 202 allows users to interact with third-party websites and a financial account provider 208.

Based on stored data about users, objects and connections between users and/or objects, the social networking system 202 generates and maintains a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 202 modifies edges connecting the various nodes to reflect the interactions.

The client device 204A is a computing device capable of receiving user input as well as transmitting and/or receiving data via the network channel 206. In one embodiment, the client device 204A is a conventional computer system, such as a desktop or laptop computer. In another embodiment, the client device 204A may be a device having computer functionality, such as a personal digital assistant (PDA), mobile telephone, a tablet, a smart-phone or similar device. In yet another embodiment, the client device 204A can be a virtualized desktop running on a cloud computing service. The client device 204A is configured to communicate with the social networking system 202, and/or the financial account provider 208 via the network channel 206. In one embodiment, the client device 204A executes an application allowing a user of the client device 204A to interact with the social networking system 202. For example, the client device 204A executes a browser application to enable interaction between the client device 204A and the social networking system 202 via the network channel 206. In another embodiment, a the client device 204A interacts with the social networking system 202 through an application programming interface (API) that runs on the native operating system of the client device 204A, such as IOS® or ANDROID™.

The client device 204A is configured to communicate via the network channel 206, which may comprise any combination of local area and/or wide area networks, using both wired and wireless communication systems. In one embodiment, the network channel 206 uses standard communications technologies and/or protocols. Thus, the network channel 206 may include links using technologies such as Ethernet, 802.11, worldwide interoperability for microwave access (WiMAX), 3G, 4G, CDMA, digital subscriber line (DSL), etc. Similarly, the networking protocols used on the network channel 206 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 206 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The social networking system 202 shown by FIG. 2 includes a profile store 210, a content store 212, an action logger 214, an action log 216, an edge store 218, an account store 220, a menu composer module 222, a menu interface module 224, and a web server 226. In other embodiments, the social networking system 202 may include additional, fewer, or different modules for various applications. Conventional components such as network interfaces, security mechanisms, load balancers, failover servers, management and network operations consoles, and the like are not shown so as to not obscure the details of the system architecture.

Each user of the social networking system 202 is associated with a user profile, which is stored in the profile store 210. A user profile includes declarative information about the user that was explicitly shared by the user, and may also include profile information inferred by the social networking system 202. In one embodiment, a user profile includes multiple data fields, each data field describing one or more attributes of the corresponding user of the social networking system 202. The user profile information stored in the profile store 210 describes the users of the social networking system 104, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 202 displayed in an image. A user profile in the profile store 210 may also maintain references to actions by the corresponding user performed on content items in the content store 212 and stored in the edge store 218.

A user profile may be associated with one or more financial accounts, allowing the user profile to include data retrieved from or derived from a financial account. A user may specify one or more privacy settings, which are stored in the user profile. The privacy settings allow the user to limit how any information regarding the user is collected, stored, shared, or any combination thereof. The privacy settings can limit information from a financial account that the social networking system 202 is permitted to access. For example, a privacy setting limits the social networking system 202 to accessing the transaction history of the financial account and not the current account balance. As another example, a privacy setting limits the social networking system 202 to a subset of the transaction history of the financial account, allowing the social networking system 202 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 202. In one embodiment, information from the financial account is stored in the profile store 210. In other embodiments, it may be stored in the account store 220.

The content store 212 stores content items associated with a user profile, such as images, videos or audio files. Content items from the content store 212 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of the social networking system 202. Examples of social networking content items include suggested connections or suggestions to perform other actions, media provided to, or maintained by, the social networking system 202 (e.g., pictures or videos), status messages or links posted by users to the social networking system, events, groups, pages (e.g., representing an organization or commercial entity), and any other content provided by, or accessible via, the social networking system.

The content store 212 also includes one or more pages associated with entities having user profiles in the profile store 210. An entity is a non-individual user of the social networking system 202, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 212, allowing social networking system users to more easily interact with the vendor via the social networking system 202. A vendor identifier is associated with a vendor's page, allowing the social networking system 202 to identify the vendor and/or to retrieve additional information about the vendor from the profile store 210, the action log 216 or from any other suitable source using the vendor identifier. In some embodiments, the content store 212 may also store one or more targeting criteria associated with stored objects and identifying one or more characteristics of a user to which the object is eligible to be presented.

The action logger 214 receives communications about user actions on and/or off the social networking system 202, populating the action log 216 with information about user actions. Such actions may include, for example, adding a connection to another user, sending a message to another user, uploading an image, reading a message from another user, viewing content associated with another user, attending an event posted by another user, among others. In some embodiments, the action logger 214 receives, subject to one or more privacy settings, transaction information from a financial account associated with a user and identifies user actions from the transaction information. For example, the action logger 214 retrieves vendor identifiers from the financial account's transaction history and identifies an object, such as a page, in the social networking system associated with the vendor identifier. This allows the action logger 214 to identify a user's purchases of products or services that are associated with a page, or another object, in the content store 212. In addition, a number of actions described in connection with other objects are directed at particular users, so these actions are associated with those users as well. These actions are stored in the action log 216.

The action log 216 may be used by the social networking system 202 to track user actions on the social networking system 202, as well as external website that communicate information to the social networking system 202. Users may interact with various objects on the social networking system 202, including commenting on posts, sharing links, and checking-in to physical locations via a mobile device, accessing content items in a sequence or other interactions. Information describing these actions is stored in the action log 216. Additional examples of interactions with objects on the social networking system 202 included in the action log 216 include commenting on a photo album, communications between users, becoming a fan of a musician, adding an event to a calendar, joining a groups, becoming a fan of a brand page, creating an event, authorizing an application, using an application and engaging in a transaction. Additionally, the action log 216 records a user's interactions with advertisements on the social networking system 202 as well as other applications operating on the social networking system 202. In some embodiments, data from the action log 216 is used to infer interests or preferences of the user, augmenting the interests included in the user profile and allowing a more complete understanding of user preferences.

The action log 216 may also store user actions taken on external websites and/or determined from a financial account associated with the user. For example, an e-commerce website that primarily sells sporting equipment at bargain prices may recognize a user of a the social networking system 202 through social plug-ins that enable the e-commerce website to identify the user of the social networking system 202. Because users of the social networking system 202 are uniquely identifiable, e-commerce websites, such as this sporting equipment retailer, may use the information about these users as they visit their websites. The action log 216 records data about these users, including webpage viewing histories, advertisements that were engaged, purchases made, and other patterns from shopping and buying. Actions identified by the action logger 214 from the transaction history of a financial account associated with the user allow the action log 216 to record further information about additional types of user actions.

In one embodiment, the edge store 218 stores the information describing connections between users and other objects on the social networking system 202 in edge objects. The edge store 218 can store the social graph described. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 202, such as expressing interest in a page on the social networking system, sharing a link with other users of the social networking system, and commenting on posts made by other users of the social networking system. The edge store 218 stores edge objects that include information about the edge, such as affinity scores for objects, interests, and other users. Affinity scores may be computed by the social networking system 202 over time to approximate a user's affinity for an object, interest, and other users in the social networking system 202 based on the actions performed by the user. Multiple interactions between a user and a specific object may be stored in one edge object in the edge store 218, in one embodiment. In some embodiments, connections between users may be stored in the profile store 210, or the profile store 210 may access the edge store 218 to determine connections between users.

The social networking system 202 includes the menu composer module 222. The menu composer module 222 can be the menu composer module 102 of FIG. 1. The menu composer module 222 can access the stores and modules of the social networking system 202 in order to generate or modify social menus. The menu composer module 222 can receive user interactions from the client device 204A for generating social menus via crowd-sourcing. As social menus are generated and stored, the menu composer module 222 can also work with other modules and stores of the social networking system 202 to utilize the social menus to select contents to display to the client device 204A.

The social networking system 202 also includes the menu interface module 224. The menu interface module 224 can be the menu interface module 118 of FIG. 1. The menu interface module 224 facilitates user interactions with the social menus and menu items in the social menu.

Figure 3:
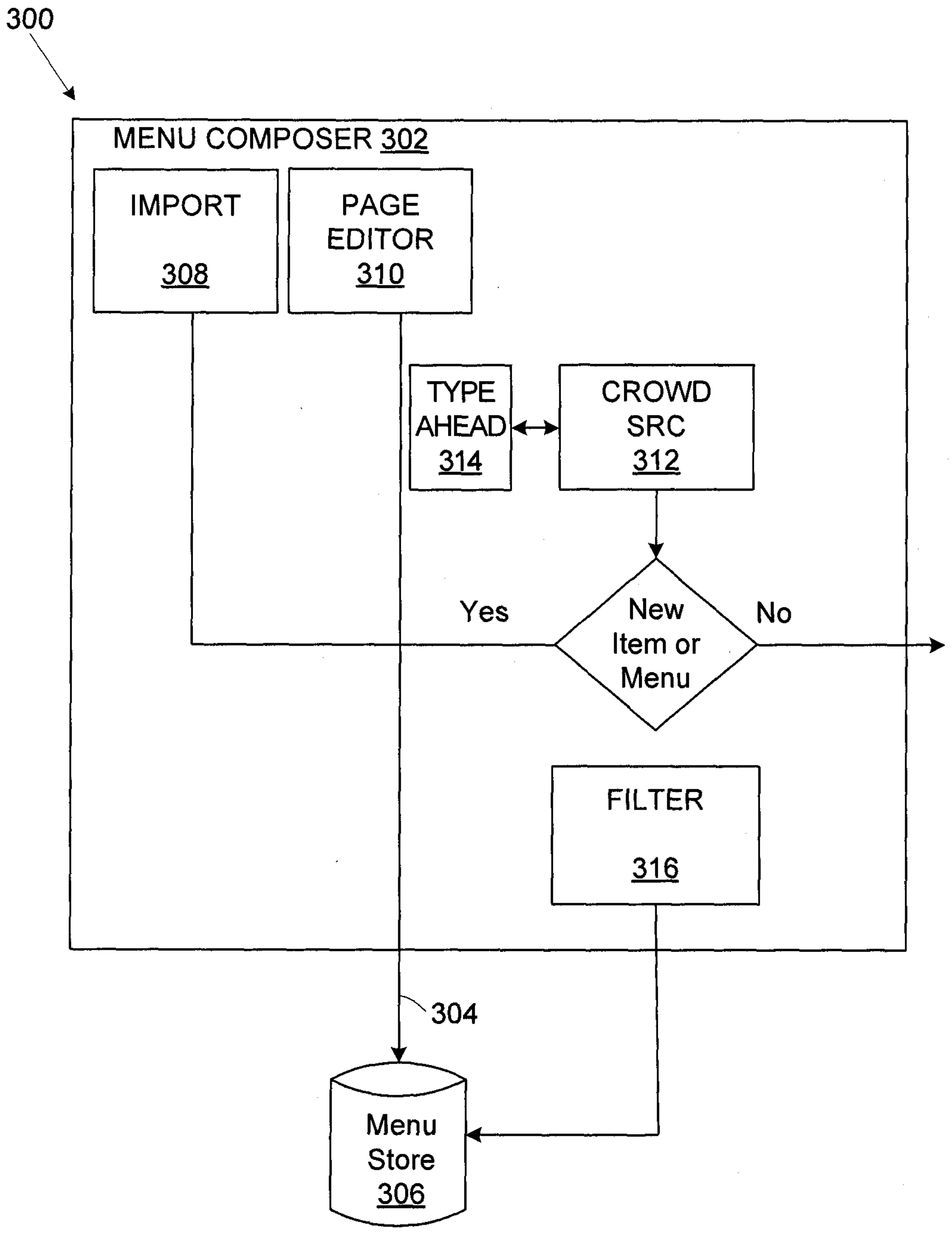
FIG. 3 is a control flow of a social networking system with a menu composer module.

Referring now to FIG. 3, therein is shown a control flow of a social networking system 300 with a menu composer module 302. The social networking system 300 can be the social networking system 202 of FIG. 2 or the social networking system 100 of FIG. 1. The menu composer module 302 can be the menu composer module 102 of FIG. 1 or the menu composer module 222 of FIG. 2. The menu composer module 302 is for generating or modifying a social menu 304 for a social network page. The social menu 304 can be the social menu 104 of FIG. 1. The social menu 304 can be stored in the social graph, such as in the edge store 218 of FIG. 2.

The menu composer module 302 can be implemented by a computer system with at least one processor and one non-transitory memory. The menu composer module 302 can also be on the same computer system as the social networking system 100 of FIG. 1 or the social networking system 202 of FIG. 2. The menu composer module 302 can be implemented by a computer system of FIG. 10.

The menu composer module 302 can include one or more methods of generating or modifying the social menus for a social network page. The one or more methods can be implemented by components, storages, and modules described below. The modules can be implemented as hardware components, software modules, or any combination thereof. For example, the modules described can be software modules implemented as instructions on a non-transitory memory capable of being executed by a processor or a controller on a machine described in FIG. 10.

Each of the modules can operate individually and independently of other modules. Some or all of the modules can be combined as one module. A single module can also be divided into sub-modules, each performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module, as illustrated by the line or arrow connections in FIG. 3.

The storages or "stores", described in this disclosure are hardware components or portions of hardware components for storing digital data. Each of the storage can be a single physical entity or distributed through multiple physical devices. Each of the storage can be on separate physical device or share the same physical device or devices. Each of the stores can allocate specific storage spaces for run-time applications.

The menu composer module 302 can include additional, fewer, or different modules for various applications. Conventional components such as network interfaces, security functions, load balancers, failover servers, management and network operations consoles, and the like are not shown so as to not obscure the details of the system.

The menu composer module 302 generates social menus and stores them at a menu store 306. The menu store 306 can be part of the edge store 218 of FIG. 2. Contents of the menu store 306 can be part of the content store 212 of FIG. 2. Profiles of the social menus can be part of the profile store 210 of FIG. 2.

The menu composer module 302 includes three main types of modules that generate or modify social menus. The menu composer module 302 includes an import module 308. The import module 308 is for importing business entity entries including a list of offerings from an external database, such as the external database 112 of FIG. 1. The import module 308 can correlate database entries of the external database with existing social menus and existing social network pages on the social networking system 300. The social network pages can be located from the profile store 210 or the edge store 218.

The menu composer module 302 includes a page editor module 310. The page editor module 310 is for configuring a social network page. Configuring the social network page includes adding a social menu to the social network page and modifying the existing social menu on the social network page. The page editor module 310 can edit the social network page through an administrator interface, such as the administrator interface 114 of FIG. 1. The administrator account can also merge social menus together as well as delete or deactivate (i.e. put into hibernation) a social menu. The page editor module 310 allows re-naming of the menu item or the social menu. The page editor module 310 also provides an interface to add or modify a social menu profile or a menu item profile.

The menu composer module 302 can include a crowd source module 312. The crowd source module 312 is for obtaining social menu modifications and new social menus from user interactions, such as user interactions recorded on the action log 216 of FIG. 2. The crowd source module 312 can provide an interface to obtain new social menus from social reporting of user accounts, such as the user accounts 116 of FIG. 1. One type of explicit reporting interface is a button on the social network page that initiates a process to create a social menu.

For another example, the process of creating the social menu can be initiated by querying the user account about a user interaction with the social network page when the user account explicitly declares an association with the social network page, such as a check-in, a "like", or a mention that references the social network page in a communication on the social networking system 300. The user account can also be queried when the user account tags the social network page in any multimedia file uploads. Querying the user account includes qualifying and clarifying what menu activity is involved in the user interaction that created the association between the user account and the social network page. For example, the user account can respond by stating that the user account was involved in "drinking" the menu item.

The process of creating the social menu can also be initiated without an explicit user interaction. For example, when a friend account of the user account tags the social network page and the user account on an uploaded photograph, the user account can be queried about the user interaction with the social network page. Also when a location of the user account (e.g. a residence location, a GPS location, or a participated event location) is proximate to a location of the user network page, the user account can also be queried about the user interaction with the social network page.

FIGS. 6A-6E illustrate a process of querying the user account regarding the social network page. When the user account specifies that the user interaction with the social network page involves a menu item and when both the menu item and a social menu do not exist for the social network page, then the social menu is added to include the menu item. When the social menu exists on the social networking system 300, but the menu item does not, then a process of modifying the social menu to include the menu item is initiated.

When querying the user account about a specific user interaction, the crowd source module 312 can activate a type-ahead module 314. The type-ahead module 314 is for identifying a reference to a specific menu item of a social menu of the social network page based on a typed query from the user account. The type-ahead module 314 can list all relevant menu items specific to the user account and the social network page when the typed query is left blank.

In one example, the user account can provide an input in the typed query including a name of a menu item that the user account has interacted with. The type-ahead module 314 can auto-complete and generate potential menu items that match the typed query. The type-ahead module 314 can allow the user account to create a menu item when none of the potential menu items matches the actual menu item that the user account has interacted with. In this case, the name of the menu item that the user account inputs to the type-ahead module 314 can become an item name of the newly generated menu item. The user account has the option of filling in an item profile of the newly generated menu item. The user account can also upload a picture to become a profile representation of the newly generated menu item, such as the profile representation 122 of FIG. 1.

The page editor module 310 can allow the administrator account to turn off the crowd source module 312 for a specific social menu or a specific menu item. The page editor module 310 can also make the specific social menu "secret." A secret social menu or a secret menu item can be discovered through the type-ahead module 314, but is not listed on the social network page, any news feed, or a non-secret social menu.

The menu composer module 302 includes a filter module 316. The filter module 316 is for identifying target menu items that are to be removed, such as target menu items that are spam. A set of criteria is used to identify whether a target menu item for a social network page in the menu store 306 is spam. For example, the set includes a number of tags or references to the target menu item recorded on the social networking system 300, a number of user accounts who have tagged the target menu item at least once, a number of marked as spam events on the target menu item, a number of menu items having been marked as spam at least once of the social network page, a number of "like" to the target menu item, a number of unique menu items created for the social network page, or any combination thereof. The filter module 316, for example, can use the authenticity confidence score 136 of FIG. 1 in the profile information of the target menu items to identify the target menu items to remove. A target menu item having the authenticity confidence score 136 below a pre-defined threshold can mean that the target menu item is to be removed.

The techniques introduced in the modules herein can be implemented by programmable circuitry programmed or configured by software and/or firmware, or they can be implemented by entirely by special-purpose "hardwired" circuitry, or in a combination of such forms. Such special-purpose circuitry (if any) can be in the form of for example, one or more application-specific integrated circuits (ASICs), programmable logic devices (PLDs), field-programmable gate arrays (FPGAs), etc.

Figure 4:
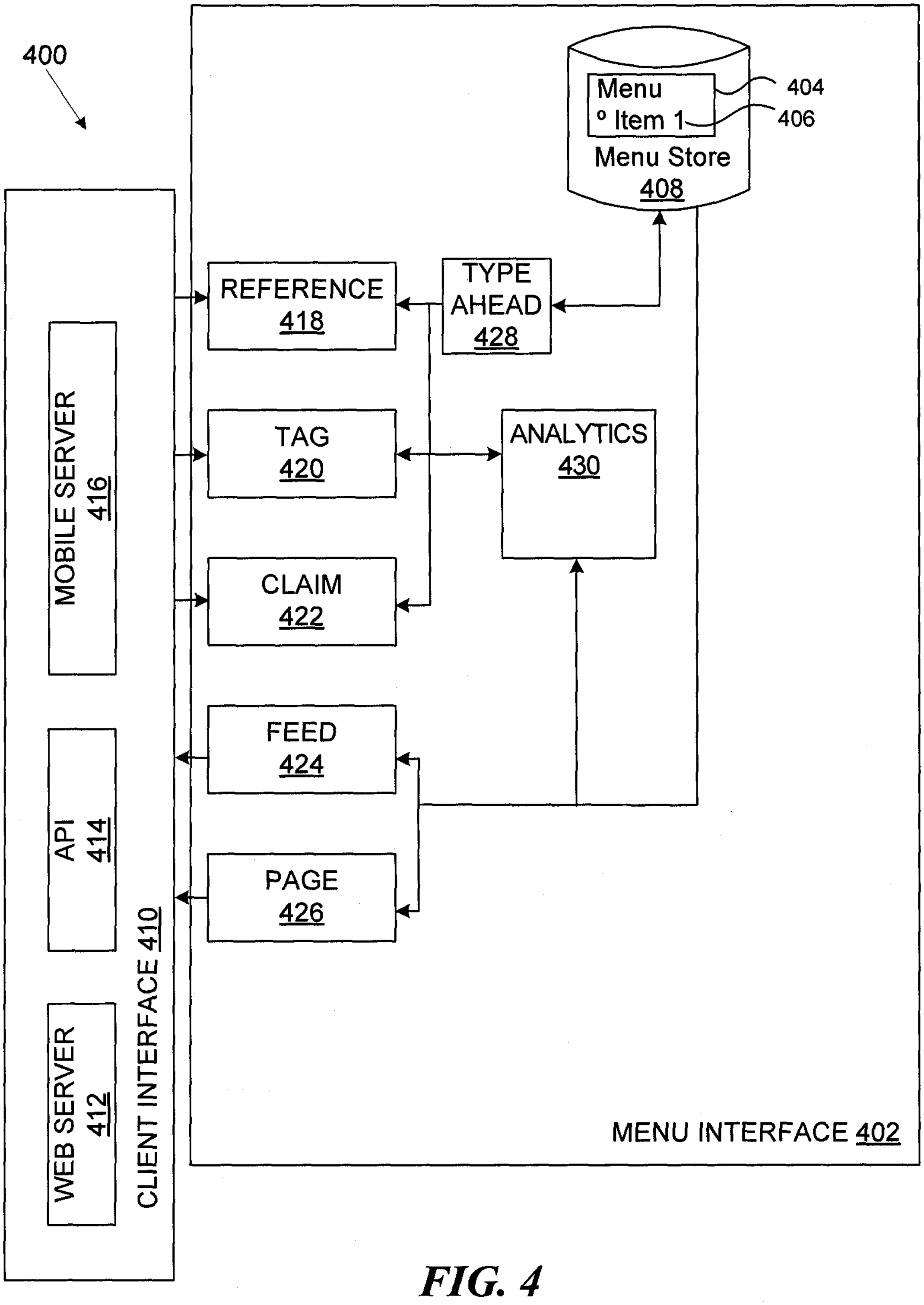
FIG. 4 is a control flow of a social networking system with a menu interface module.

Referring now to FIG. 4, therein is shown a control flow of a social networking system 400 with a menu interface module 402. The social networking system 400 can be the social networking system 202 of FIG. 2 or the social networking system 100 of FIG. 1. The menu interface module 402 can be the menu interface module 118 of FIG. 1 or the menu interface module 224 of FIG. 2. The menu interface module 402 is for facilitating user interactions with a social menu 404 or a menu item 406 stored on a menu store 408. The social menu 404 can be linked to at least one social network page. The social menu 404 can be the social menu 104 of FIG. 1. The menu item 406 can be the menu item 108 of FIG. 1. The menu store 408 can be the menu store 306 of FIG. 3.

The menu interface module 402 can be implemented by a computer system with at least one processor and one non-transitory memory. The menu interface module 402 can also be on the same computer system as the social networking system 100 of FIG. 1 or the social networking system 202 of FIG. 2. The menu interface module 402 can be implemented by a computer system of FIG. 10.

The menu interface module 402 can include one or more methods of facilitating user interactions with the social menu 404 or the menu item 406. The one or more methods can be implemented by components, storages, and modules described below. The modules can be implemented as hardware components, software modules, or any combination thereof. For example, the modules described can be software modules implemented as instructions on a non-transitory memory capable of being executed by a processor or a controller on a machine described in FIG. 10.

Each of the modules can operate individually and independently of other modules. Some or all of the modules can be combined as one module. A single module can also be divided into sub-modules, each performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module, as illustrated by line or arrow connections in FIG. 4.

The menu interface module 402 can include additional, fewer, or different modules for various applications. Conventional components such as network interfaces, security functions, load balancers, failover servers, management and network operations consoles, and the like are not shown so as to not obscure the details of the system.

The menu interface module 402 facilitates user interactions received from a client interface 410. The client interface 410 can include a web server 412. The web server 412 can be the web server 226 of FIG. 2. The client interface 410 can include an API module 414. The API module 414 is for providing an application programming interface (API) of communication between any external device, operating system, or software and the social networking system 400. For example, the API module 414 can communicate with a widget from another website or a mobile application. The client interface 410 can include a mobile server 416. The mobile server 416 can be a server for providing social networking services to mobile devices. The mobile server 416 can be the same server as the web server 412. The mobile server 416 can be the web server 226 of FIG. 2.

The menu interface module 402 includes a reference module 418, a tag module 420, and a claim module 422 to facilitate user interactions. The menu interface module 402 can also include a feed module 424 and a page module 426 to present information to user accounts based on the user interactions. One type of user interaction that is facilitated by the reference module 418, the tag module 420, or the claim module 422 includes user accounts selecting the social menu 404 or the menu item 406 through a type-ahead module 428. User interactions recorded through the reference module 418, the tag module 420, and the claim module 422 can also be analyzed and reported to an administrator account of a social network page through an analytics module 430.

The reference module 418 is for providing a reference link to the social menu 404 or the menu item 406. User accounts can select the menu item 406 or the social menu 404 to reference through the type-ahead module 428. The type-ahead module 428 provides a query box for users to enter a typed query to identify a target menu item. The type-ahead module 428 also presents a list of menu items that matches the typed query for user selection. The type-ahead module 428 can be the type-ahead module 314 of FIG. 3. The target menu item can be identified by matching names of menu items in the menu store 408.

The tag module 420 is for providing an interface for a user account to tag the social menu 404 or the menu item 406 to a social object in the social networking system 400, such as a multimedia file or a stored communication. The social menu 404 or the menu item 406 can be identified through the type-ahead module 428. For example, the user account can upload a picture of a burrito to the social networking system 400. In the example, the tag module 420 can allow the user account to tag the picture with the social menu 404 of a Mexican restaurant and to tag the picture specifically with the menu item 406, which is a chicken burrito.

The claim module 422 is for facilitating a direct action from the user account to the social network page. This direct action involves claiming an interaction with an object or item associated with the social network page in the social menu 404, such as the menu item 406. The menu item 406 can be identified through the type-ahead module 428. Claiming includes reserving, purchasing, renting, selling, bidding, capturing, eating, drinking, obtaining, listening, other forms of offer claiming, or any combination thereof. For each of the menu item 406 claimed, the claim module 422 can report out to the administrator account of the social menu 404 having the menu item 406. An inventory of the social menu 404 can be automatically tracked based on the claims received from the claim module 422. Reservation for the menu item 406 can be stored as a reservation with the social network page with an indication of which of the menu item 406 triggered the reservation.

The feed module 424 is for generating a news-feed story. The feed module 424 can generate the news-feed story based on a user interaction between the menu item 406 and a social object in a social graph of a user account. First, the feed module 424 can receive the user interaction from the client interface 410. The feed module 424 can then determine a relevancy score between the menu item 406 and the user account based on the user interaction. Upon determining the relevancy score, the feed module 424 can present the menu item 406 to the user account in the news-feed story based on the relevancy score, such as by thresholding the relevancy score. The news-feed story can be published to an inbox of the user account, a profile wall of the user account, a time-line of the user account, or any combination thereof.

The page module 426 is for displaying information about the social network page. The page module 426 can present a social menu page of the social menu 404. For example, the social menu page can be the social menu page 106 of FIG. 1. The social menu page include a social menu profile, a social context, a review rating, individual menu items, reference links to item pages of the individual menu items, or any combination thereof. Each of the menu items has a menu item page, such as the item page 120 of FIG. 1. The menu item page includes a profile representation, a name/title, a description, a social context, a review rating, multimedia files, or any combination thereof.

The analytics module 430 is for providing information about user interactions with the social menu 404 and the menu item 406. For example, whenever the reference module 418 is used to reference the social menu 404 or the menu item 406, the analytics module 430 can collect that referencing action for presentation to an administrator interface for an administrator account of the social menu 404 to view. For example the administrator interface can include daily activity of the reference module 418, daily activity of the tag module 420, the daily activity of the claim module 422, or any combination thereof.

The analytics module 430 can also include metadata from the feed module 424 and the page module 426. For example, the analytics module 430 can receive information about viewing time and responsiveness to the news-feed story presented by the feed module 424. The analytics module 430 can also record responsive rate to the menu item 406 based on different arrangement of the social menu page or the menu item page. The analytics module 430 can update the administrator interface based on the viewing time records and the responsiveness records. It has been discovered that the analytics module 430 can provide valuable business decision information for promoting the social menu 404 or the menu item 406.

The techniques introduced in the modules herein can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Figure 5:
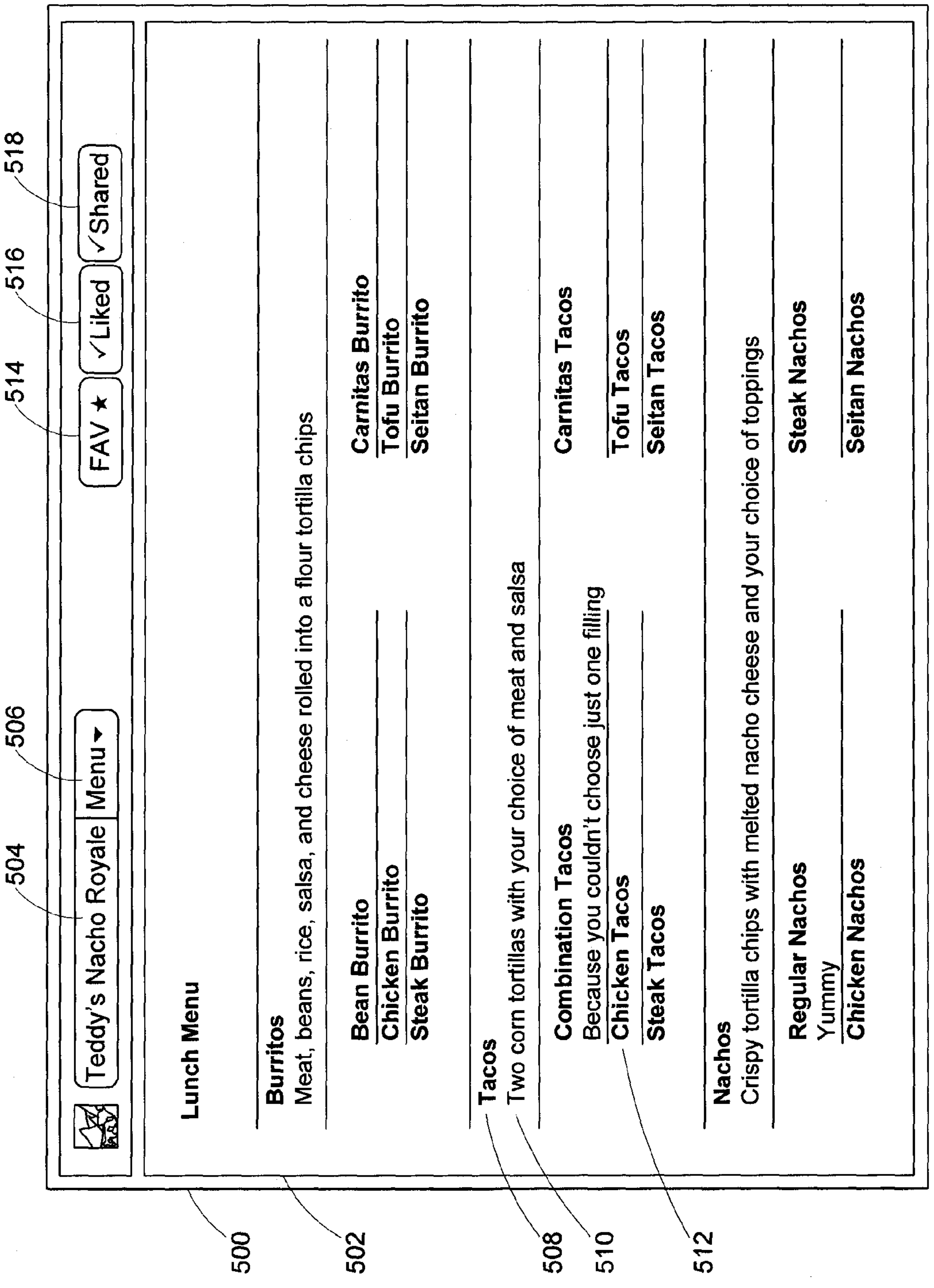
FIG. 5 is an example illustration of a social network page having a menu page.

Referring now to FIG. 5, therein is shown an example illustration of a social network page 500 having a menu page 502. The social network page 500 can be the social network page 106 of FIG. 1. The social network page 500 can be generated by the page module 426 of FIG. 4. The social network page 500 can be a multi-frame display. The social network page 500 can also include layers. As illustrated, the social network page 500 includes a page name 504. The page name 504 is a title of the social network page 500. The page name 504, for example, can be the name of the business entity that the social network page 500 represents.

The social network page 500 can also include a layer toggle 506. The layer toggle 506 is an interactive button of the social network page 500 for selecting a particular content of the social network page 500. As illustrated, the layer toggle 506 in FIG. 5 is set to display the menu page 502.

The menu page 502 is a formatted presentation of a social menu, such as the social menu 104 of FIG. 1. The menu page 502 can be the menu page 138 of FIG. 1. The menu page 502 can include a layout of menu items. For example, the menu page 502 can include an item name 508. The item name 508 is a title of a menu item in the social menu represented by the menu page 502, such as the menu item 108 of FIG. 1. The menu page 502 can also include an item description 510. The item description 510 describes the menu item corresponding to the item name 508. The menu page 502 can also include an item variant 512 of the menu item. The item variant 512 is a label for a version of the item name 508. As illustrated, the item variant 512 is a customization of a food content in the "burrito" menu item.

The menu page 502 can be shared, bookmarked, recommended, or liked. For example, a favorite button 514 illustrates that the menu page 502 is a favorite bookmarked social menu. A liked button 516 illustrates that the menu page 502 is liked, and thus the user account accessing the social network page 500 has explicitly subscribed to contents of the menu page 502. This subscription can also be available in a user profile of the user account. A shared button 518 illustrates that the menu page 502 has been shared by the user account accessing the social network page 500 to other user accounts on a social networking system, such as the social networking system 100 of FIG. 1.

Referring now to FIGS. 6A-6E, therein are illustrated an example of a menu type-ahead mechanism of a social networking system 600. FIGS. 6A-6E illustrate a mobile update interface 602 generated by the social networking system 600 to facilitate a user activity update, such as a check-in or a profile status update. The mobile update interface 602 can be generated on the social networking system 600 and shown on a client device, such as the client device 204A of FIG. 2.

Figure 6A:
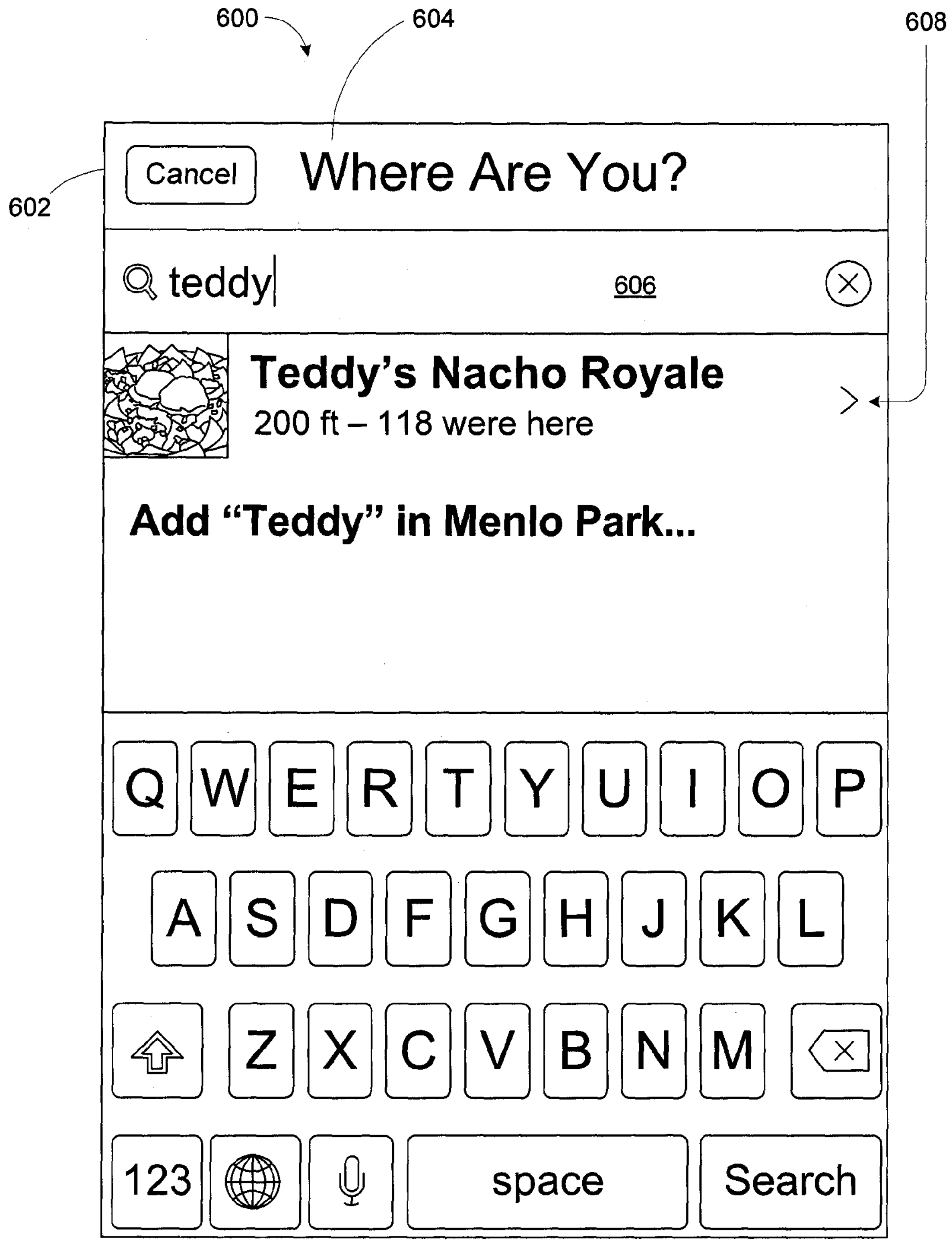
FIGS. 6A-6E illustrate an example of a menu type-ahead mechanism of a social networking system.

FIG. 6A illustrates a location prompt 604 generated by the social networking system 600. The location prompt 604 asks a user to identify a current location of the user. The mobile update interface 602 can include a search box 606. The search box 606 can be coupled to a type ahead module, such as the type-ahead module 314 of FIG. 3 or the type-ahead module 428 of FIG. 4. The search box 606 allows the user to input a typed query, such as a name of a place the user is/was at. Based on the typed query entered in the search box 606, the type-ahead module can suggest social network pages with a name or description that matches the typed query. The suggested social network pages can be determined based on a device location of the client device, such as a GPS location. For example, the social network pages suggested can include a social network page 608. As illustrated, only a summary of the social network page 608 is presented on the client device. However, by clicking on the social network page 608, a formatted presentation of the social network page 608 can be shown with further profile details.

When a social network page cannot be matched to the typed query, the location prompt 604 can be answered by a user description of his/her current location. In FIG. 6A, the user has the option of entering the typed query "Teddy" as his current location. Whenever the type-ahead module is used with the search box 606, the user account can have the option of adding the typed query into the social networking system 600 even if no match is made.

Figure 6B:
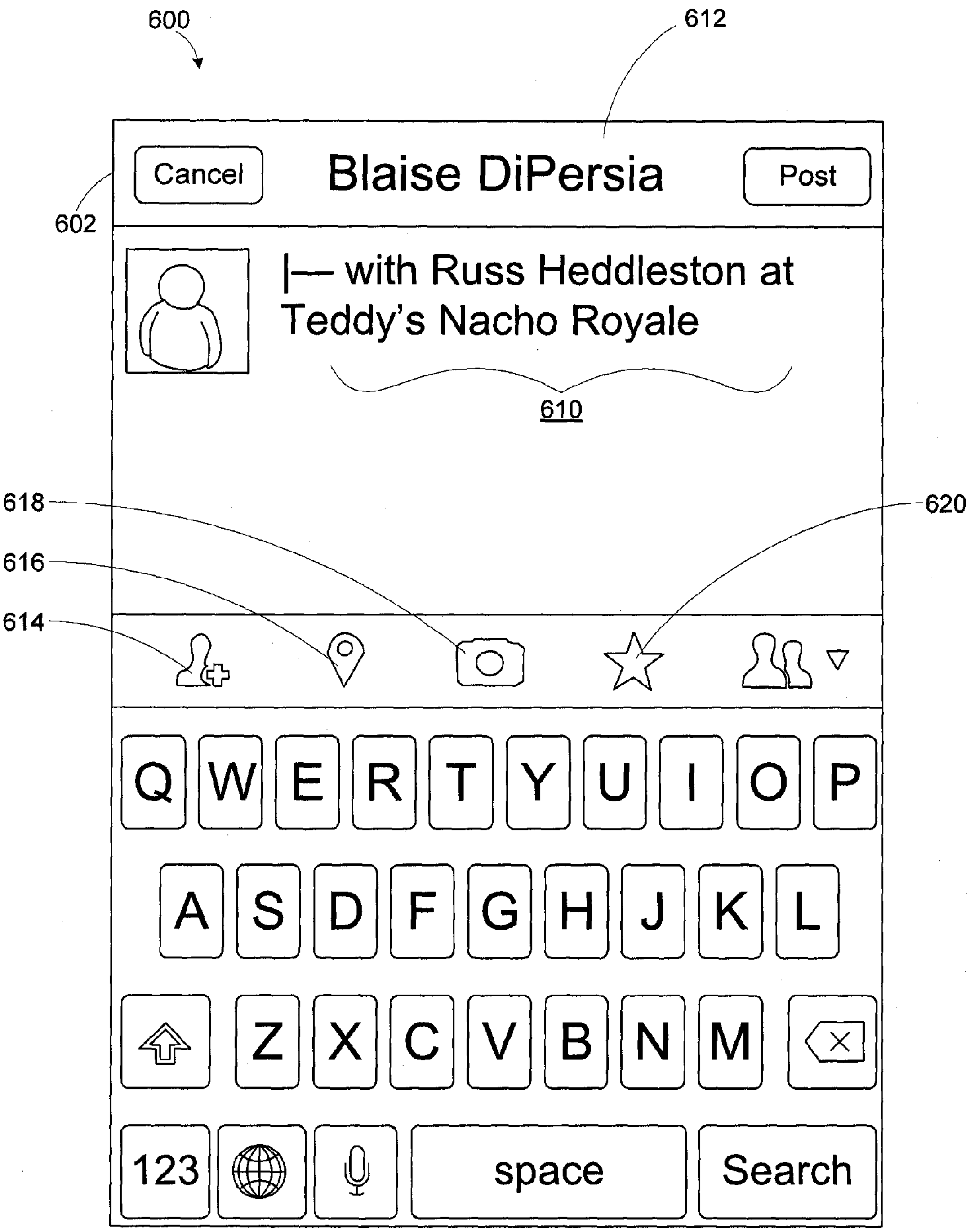

FIG. 6B illustrates an update message 610 generated by the social networking system 600 on the mobile update interface 602. The mobile update interface 602 includes a user account 612 making the update message 610. The update message 610 is generated based on inputs created by the user account 612. For example, the update message 610 includes a reference link to the social network page 608, which is selected by the user account 612 as illustrated by FIG. 6A.

The mobile update interface 602 can include an add person button 614, an add location button 616, and an add multimedia file button 618. The add person button 614 allows the social networking system 600 to prompt the user to add another user account who is "with" the user account 612. "With" here can refer to co-location, intent for co-location, or just an acknowledgement of presence. The added another user account is listed in the update message 610. The add location button 616 allows the social networking system 600 to generate the location prompt 604 as illustrated by FIG. 6A. The added location, such as the social network page 608, is also included in the update message 610. The add multimedia file button 618 allows the social networking system 600 to prompt the user account 612 to include a multimedia file associated with the update message 610. The mobile update interface 602 also allows the user account 612 to add old favorite locations or social network pages to the update message 610 by an add favorite button 620.

Figure 6C:
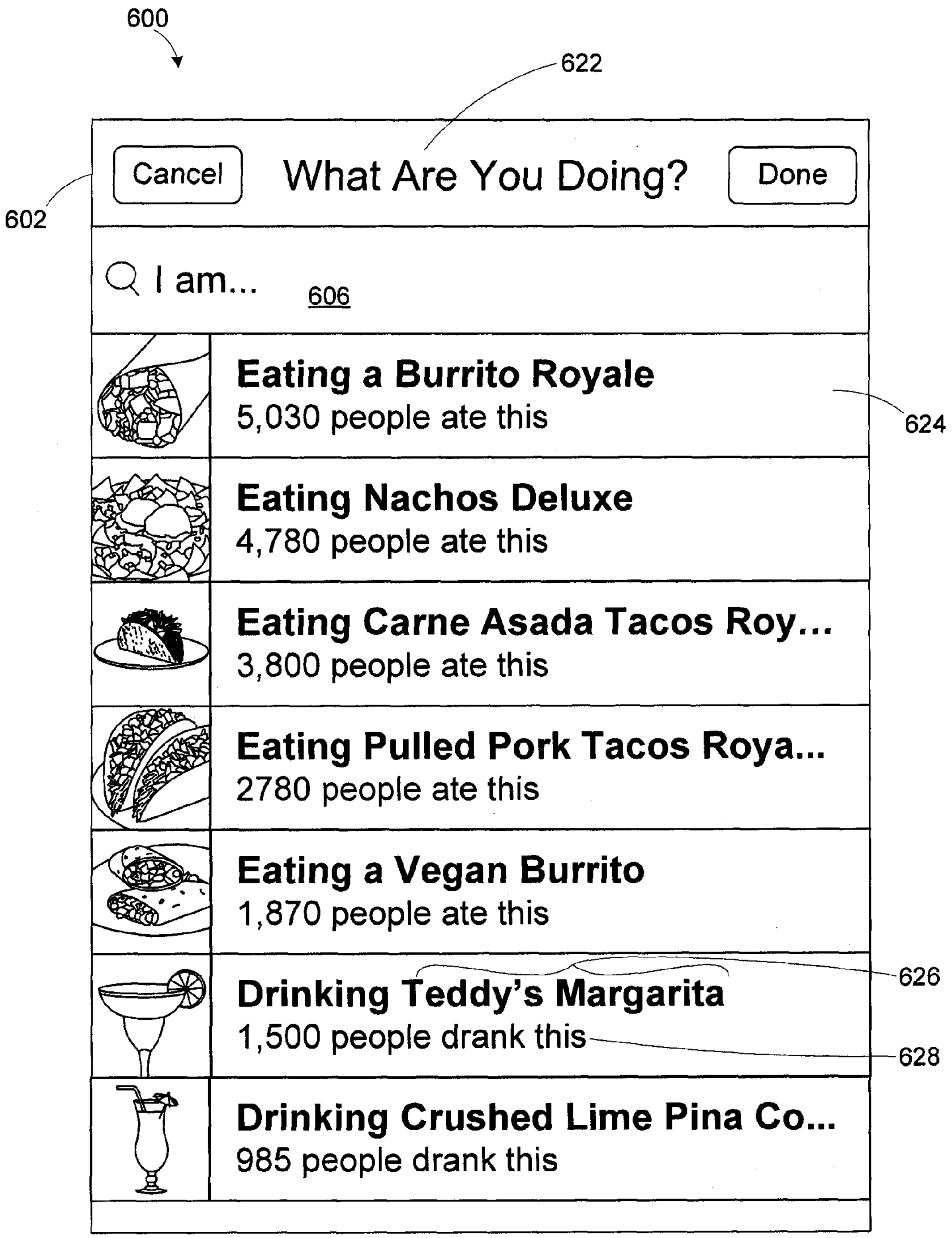

FIG. 6C illustrates an activity query 622 generated by the social networking system 600 on the mobile update interface 602. The activity query 622 asks the user account 612 what kind of activity the user account 612 is engaging in at the specified location represented by the social network page 608. Suggestion of a potential activity 624 can be shown on the mobile update interface 602. The potential activity 624 can be associated with a menu item 626. The menu item 626 can be the menu item 108 of FIG. 1. The menu item 626 can be a menu item on a social menu of the social network page 608. The potential activity 624 can be generated based on available menu items of the social menu of the social network page 608. A social context 628 can also be included with the suggestion of the potential activity 624. The social context 628 can be the social context 130 of FIG. 1.

Figure 6D:
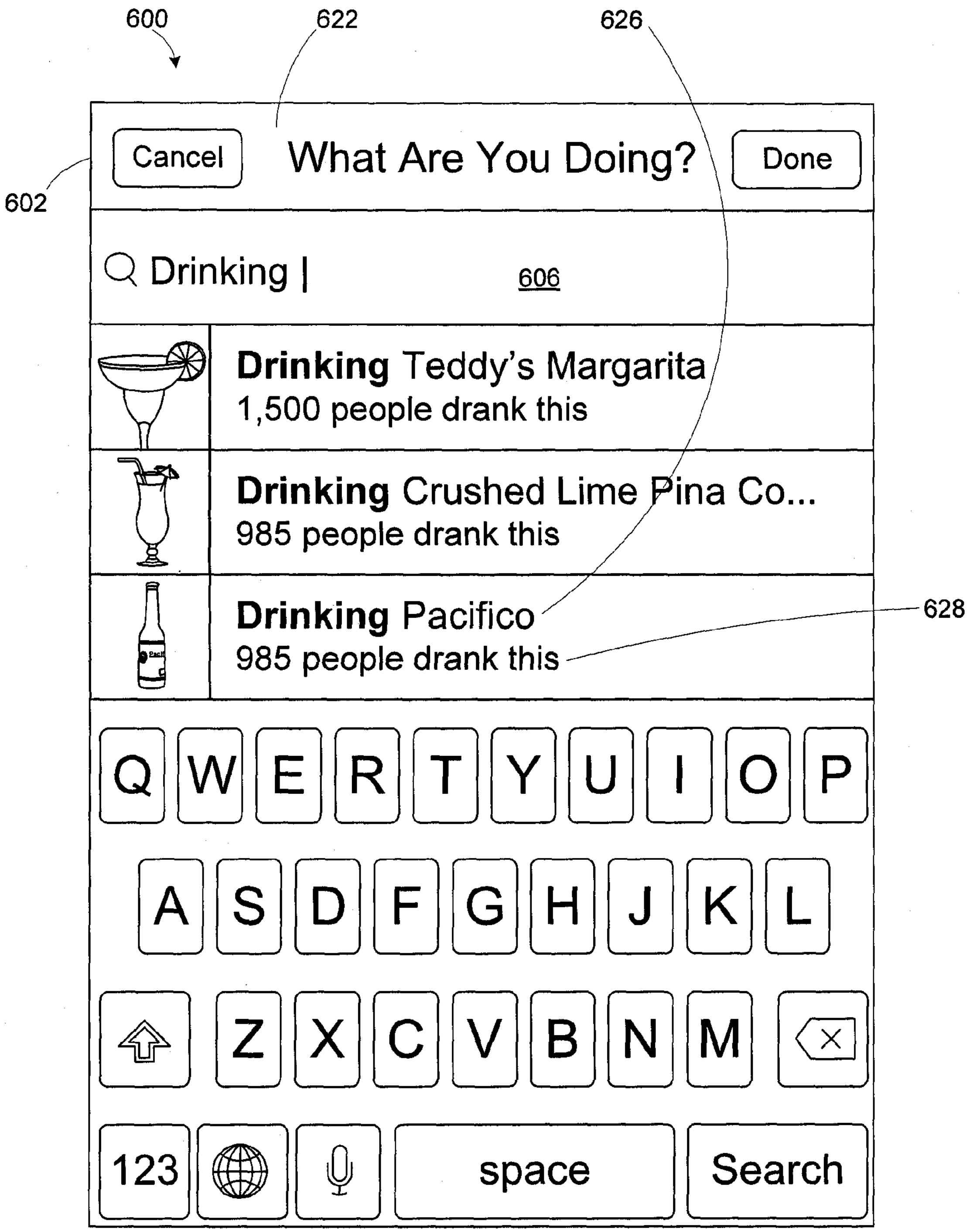

FIG. 6D illustrates the activity query 622 as the user account 612 is entering a typed query to the search box 606 of the type-ahead module. Here, the user account 612 can enter "Drinking" in the search box 606. The type-ahead module can list out all menu items for drinking. Menu item profiles can include metadata of what kind of activities can be performed on them, including "eating", "drinking", "watching", "reading", "buying", or any combination thereof.

Figure 6E:
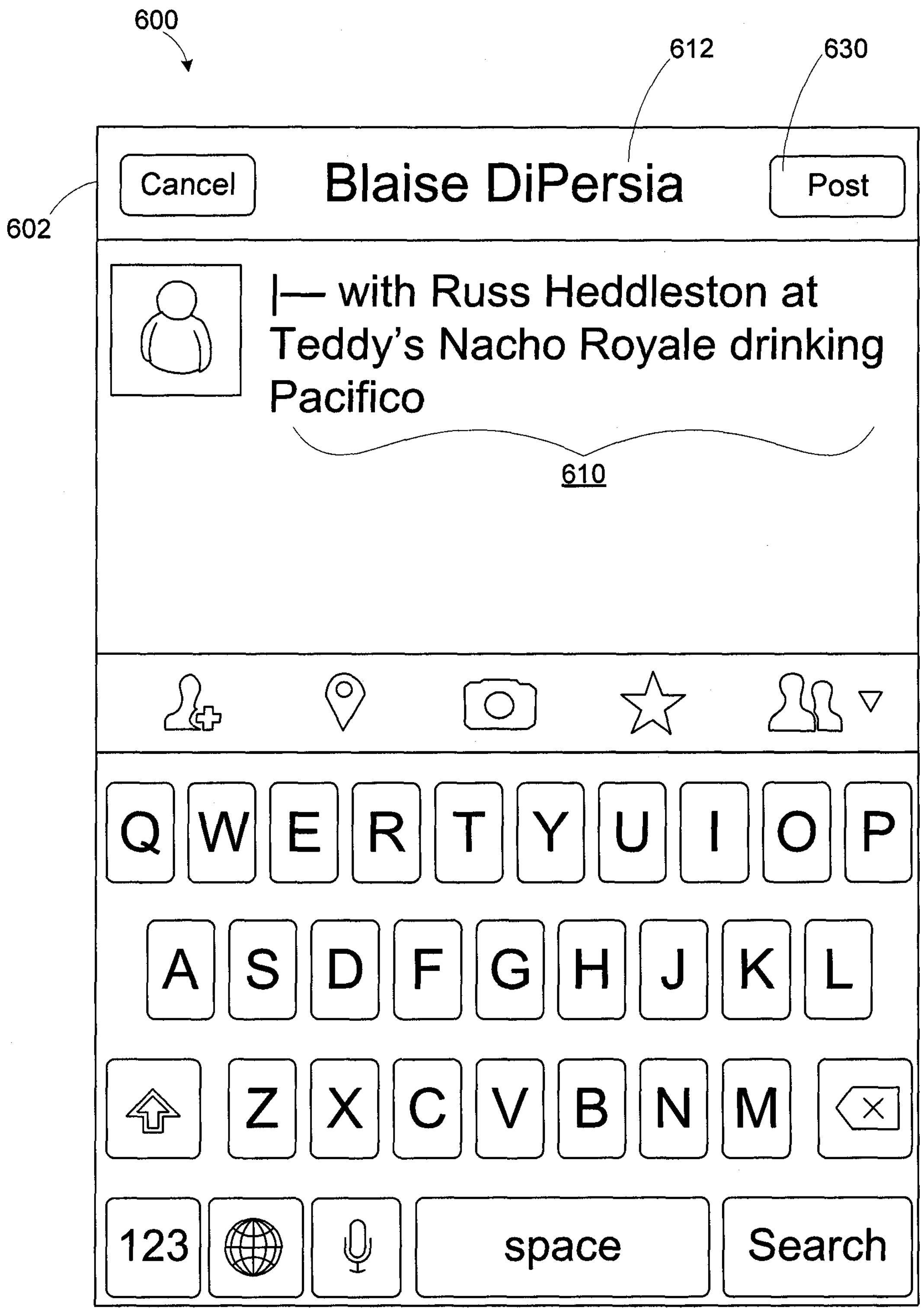

FIG. 6E illustrates the update message 610 completed by the user account 612 with assistance of the type ahead module of the social networking system 600. Here, a message indicating that the user account 612 is at the social network page 608 with another user account drinking the menu item 108 is shown. The mobile update interface 602 allows the user account 612 to post the update message 610 at any given time by pressing a post button 630.

Figure 7A:
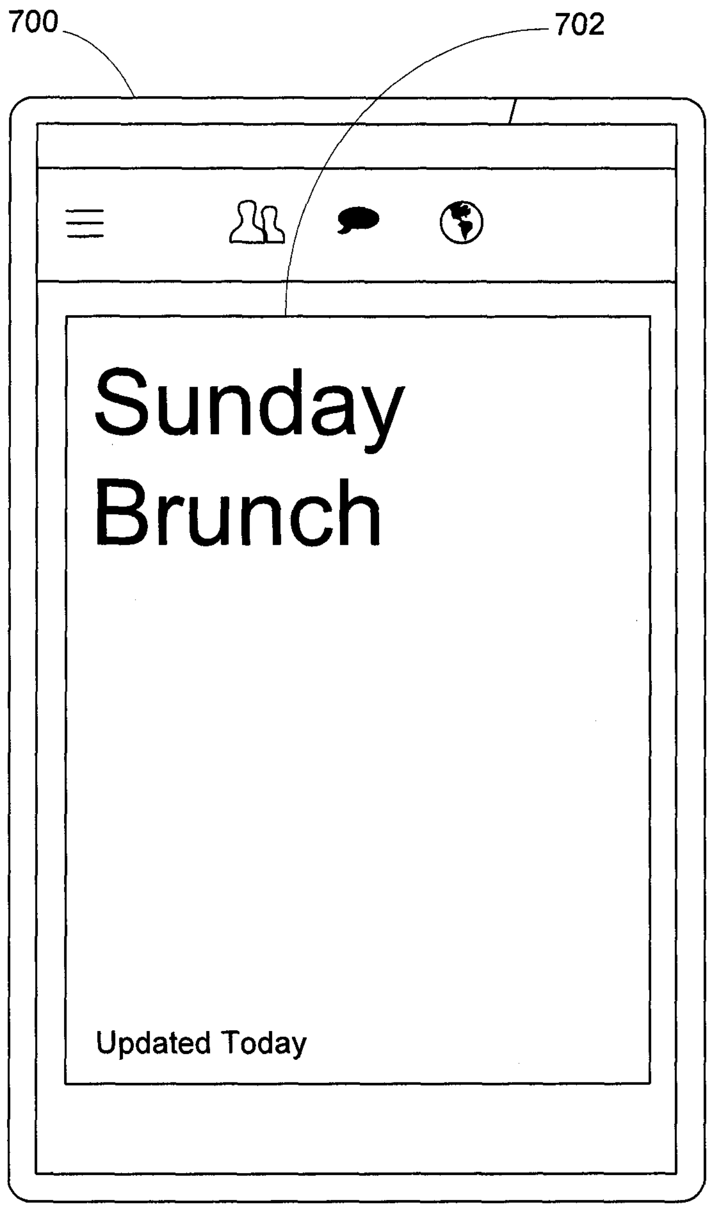
FIGS. 7A-7E illustrate an example of a menu page.

Referring now to FIGS. 7A-7E, therein are illustrated an example of a menu page 700. FIG. 7A illustrates the menu page 700 of a social menu, such as the social menu 104 of FIG. 1. The menu page 700 can be interactive. The menu page 700 can include a front page 702. The front page 702 of the menu page 700 can include a message from an administrator account of the menu page 700 to advertise or promote particular menu items, social menus, or any other items or activities.

Figure 7B:
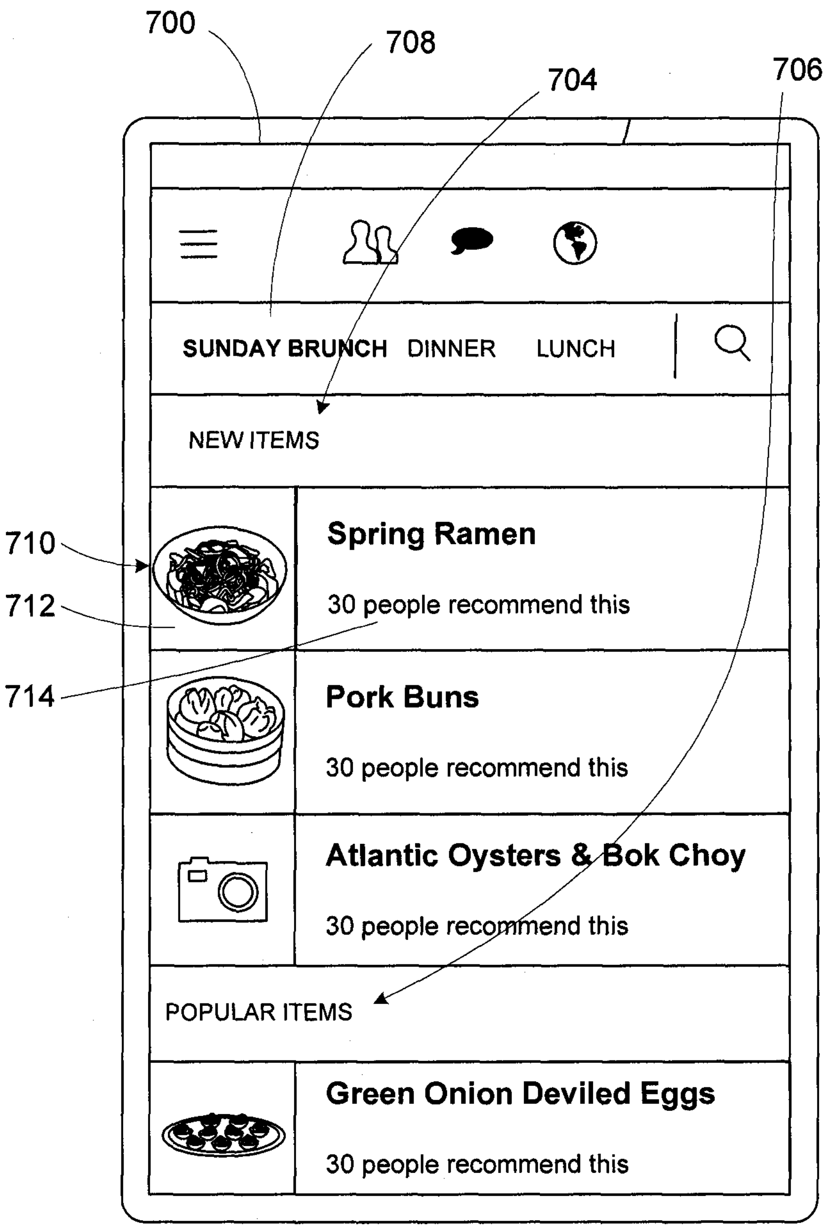

FIG. 7B illustrates the menu page 700 with sub-menus. For example the menu page 700 can include social menus generated with metadata from a social networking system, such as the social networking system 100 of FIG. 1. The menu page 700 includes a new items sub-menu 704 and a popular sub-menu 706. The new items sub-menu 704 is a sub-menu of the menu page 700 generated from all menu items in the social menu of the menu page 700 based menu item creation dates. The popular sub-menu 706 is a sub-menu of the menu page 700 generated from all menu items in the social menu of the menu page 700 based on user interactions with each of the menu items.

The menu page 700 can also include a first-tier sub-menu 708. The first-tier sub-menu 708 is a sub-menu created by the administrator account of the menu page 700 or by menu data received from an external database, such as the external database 112 of FIG. 1. For example, the first-tier sub-menu 708 can be a sub-menu for a specific time of the week, season, time of the day, or any combination thereof, such as a "Sunday Brunch" menu.

Each of the sub-menus can include a menu item 710. The menu item 710, for example, can include a profile representation 712. The profile representation 712 can be the profile representation 122 of FIG. 1. The menu item 710 can also include a social context 714, such as the social context 130 of FIG. 1.

Figure 7C:
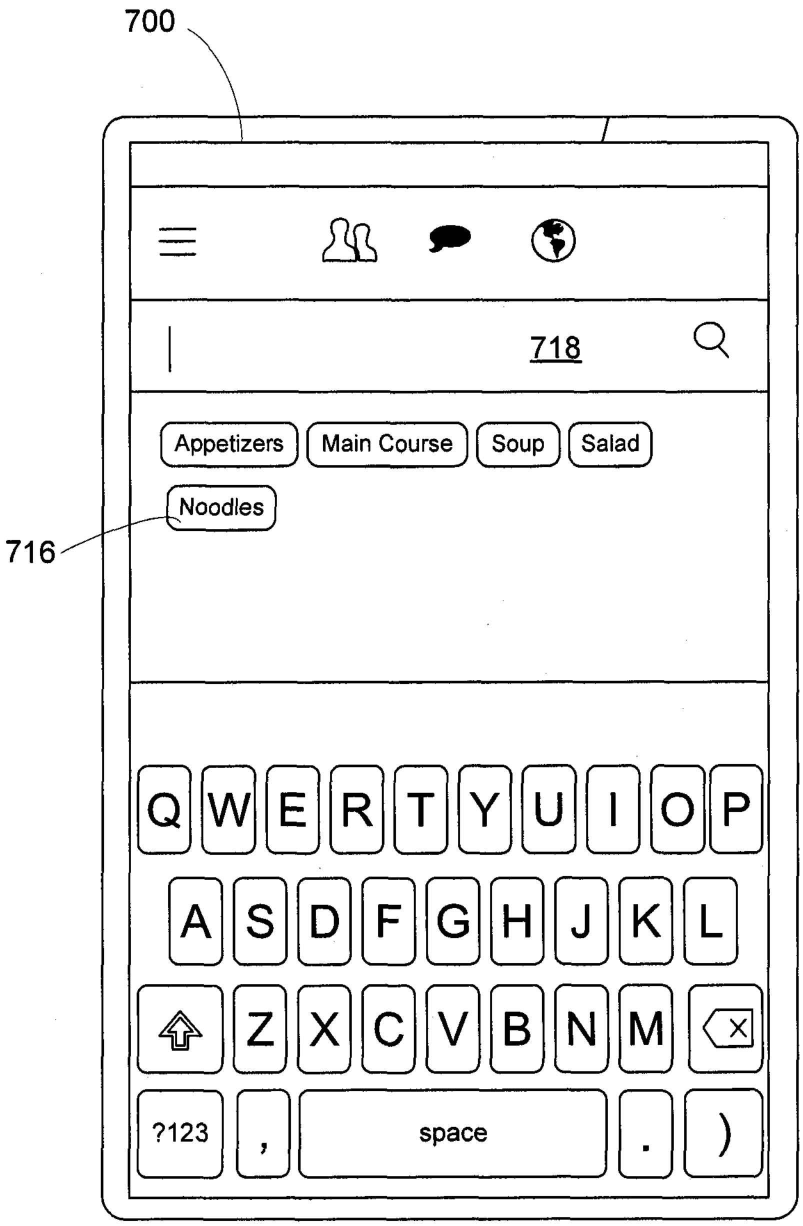

FIG. 7C illustrates the menu page 700 with a second-tier sub-menu 716. There can be multiple tiers of sub-menus for the social menu of the menu page 700. The first tier may be differentiated by time of day, and the second tier may be differentiated by type of offering. For example, the second-tier sub-menu 716 can be a sub-menu of "Main Course" food items. The menu page 700 can also include a search box 718 to search menu items within the social menu. The search box 718 can also be used to identify sub-menus based on the names of the sub-menus.

Figure 7D:
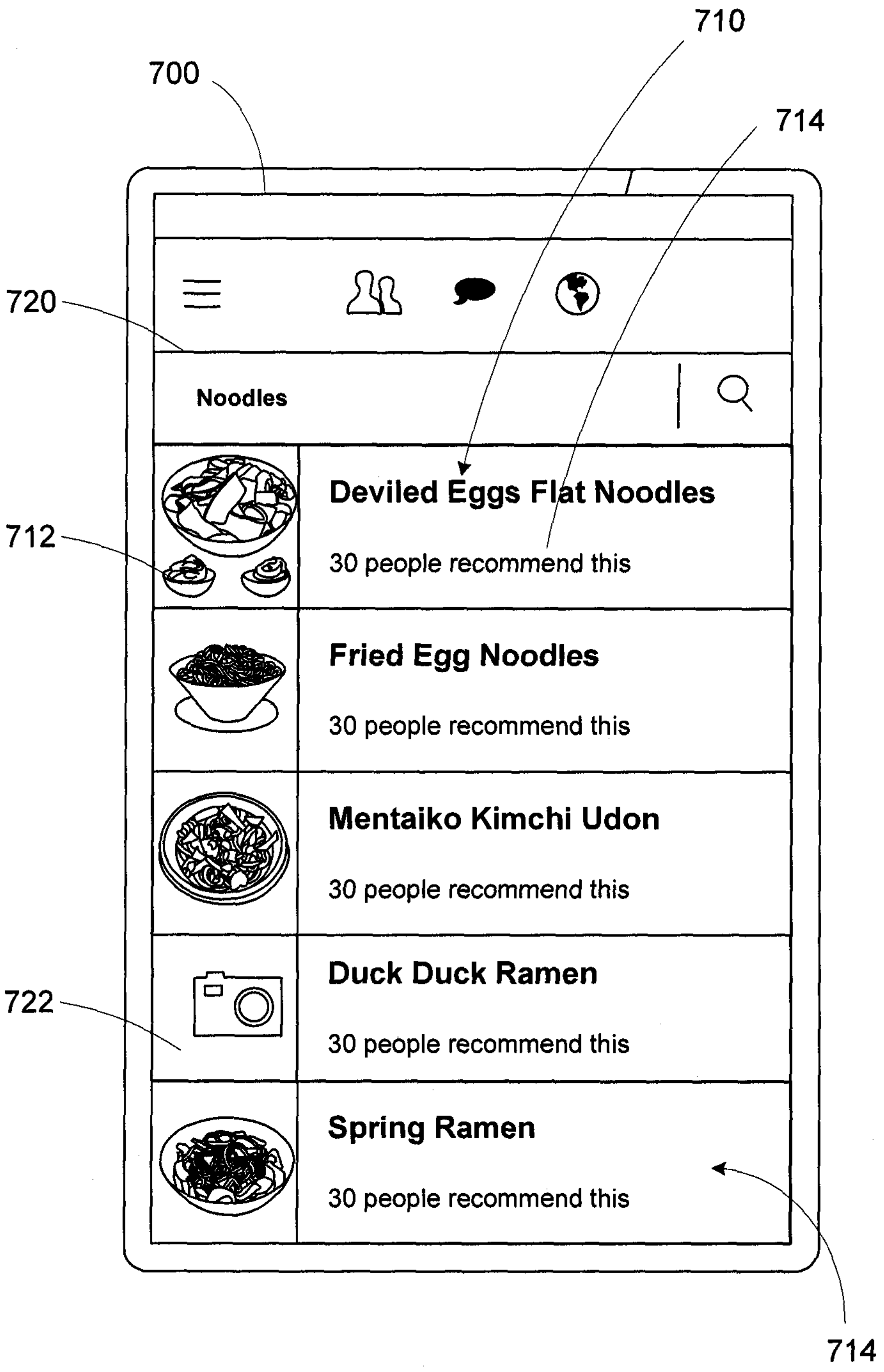

FIG. 7D illustrates a sub-menu page 720 within the menu page 700. The sub-menu page 720 is a sub-menu page within the menu page 700. For example, the sub-menu page 720 can be a formatted presentation for profile information of the second-tier sub-menu 716. The second-tier sub-menu 716 can include the menu item 710. Multiple sub-menus can share a same menu item, such as the menu item 710. Here, the second-tier sub-menu 716 shares the menu item 710 as the new items sub-menu 704. Some menu items displayed on the sub-menu page 720 can be missing a profile representation, such as a missing picture 722 illustrated by the camera icon.

Figure 7E:
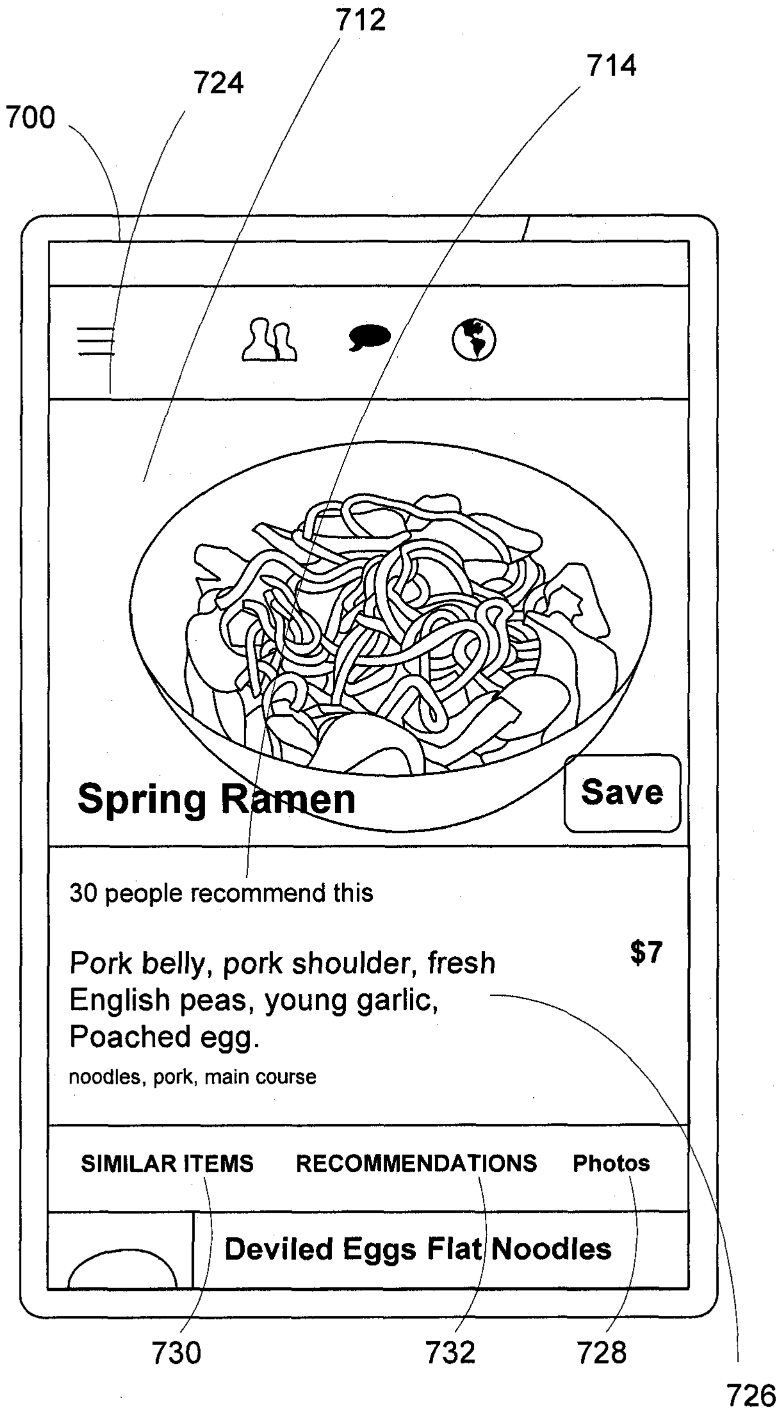

FIG. 7E illustrates an item page 724 within the menu page 700. The item page 724 can be a formatted presentation of the menu item 710. The item page 724 can include an item description 726 of the menu item 710. The item page 724 can include the social context 714 of the menu item 710. The item page 724 can also include other information of the menu item 710 including price and what sub-menus that the menu item 710 is a part of. The item page 724 can include a reference link to browse multimedia files 728 of the menu item 710. For example, the multimedia files 728 can be the multimedia files 124 of FIG. 1.

The item page 724 can include reference links to other system generated sub-menus. For example, the item page 724 can include a similar item sub-menu 730 and a recommendation sub-menu 732. The similar item sub-menu 730 can be a sub-menu generated from all menu items in the social menu based on categorical information of each of the menu items. The similar item sub-menu 730 can also be a sub-menu across multiple social menus. For example, categorical information of social menus can first be compared to find similar social menus in the same category. Then the similar item sub-menu 730 can be generated based on all menu items in the similar social menus based on categorical information of each of those menu items.

The recommendation sub-menu 732 is a sub-menu generated from a social context of a social graph of a user account. For example, the recommendation sub-menu 732 can be the sub-menu generated from all menu items in the social menu based on recommendations or "likes" made within a first degree connection in the social graph of the user account. The user account can be the account that is currently viewing the item page 724.

Figure 8:
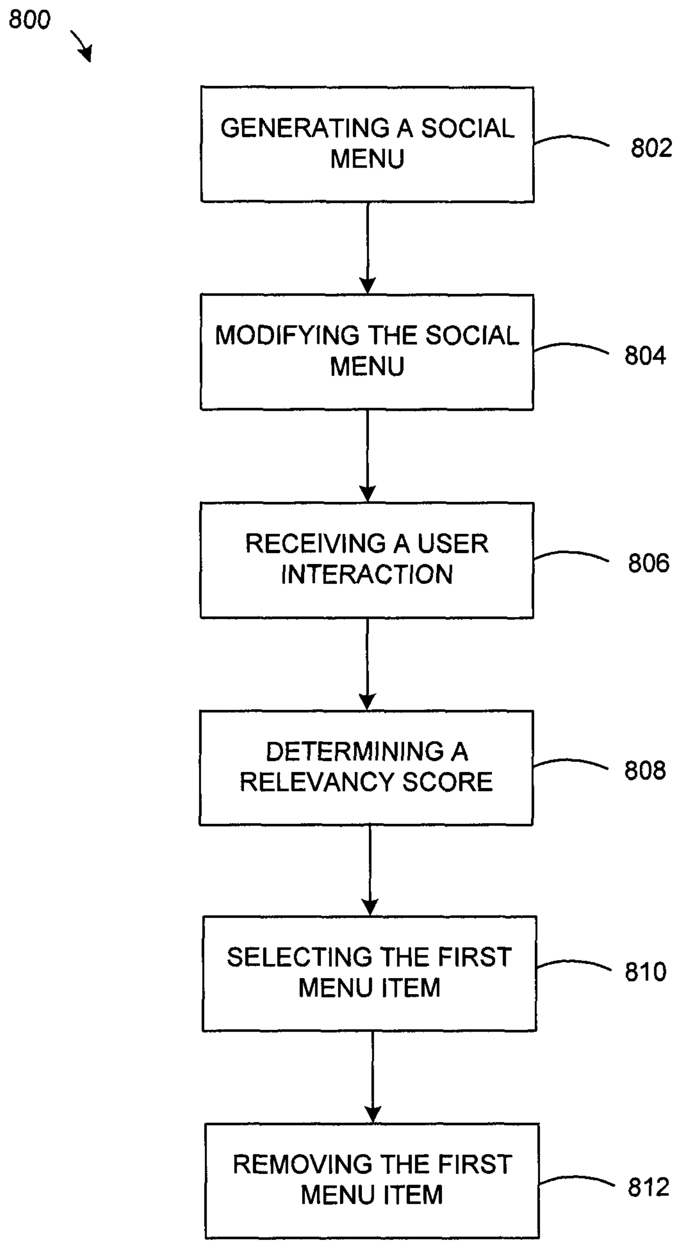
FIG. 8 is a flow chart of a method of operating a social networking system in an embodiment.

Referring now to FIG. 8, therein is shown is a flow chart of a method 800 of operating a social networking system, such as the social networking system 100 of FIG. 1 or the social networking system 202 of FIG. 2, in an embodiment. The method 800 includes a method step 802 of generating a social menu for a first social network page in a social networking computer system, the social menu including a first menu item offered through the first social network page. The method step 802 can be accomplished in several ways. In one embodiment, the method step 802 can be accomplished by importing a database including a business offering list of a business entity; determining a correspondence between the business entity and the first social network page; and generating the social menu from the business offering list. In some embodiments, generating the social menu requires uploading a multimedia file as a profile picture of the first menu item. In other embodiments, the profile picture can be uploaded by other user accounts subsequently.

In one embodiment, the method step 802 can be accomplished by generating the social menu by sharing the social menu from a second social network page. In another embodiment, the method step 802 can be accomplished by activating the social menu from hibernation, wherein the hibernation prevented the social menu from being accessed in the social networking computer system. In yet another embodiment, the method step 802 can be accomplished by receiving an item interaction with the first menu item and adding the first menu item to the social menu based on the item interaction. The item interaction can be queried by the social networking computer system. For example, the method step 802 can include receiving a crowd interaction with the first social network page from a crowd account and querying the crowd account to specify the item interaction with the first menu item. Such crowd sourcing mechanism for generating the menu item can be disabled by an administrator account of the first social network page.

The method 800 can include a method step 804 of modifying the social menu. Modifying the social menu can include merging a second menu item with the first menu item. Modifying the social menu can also include modifying an accessibility of the first menu item by receiving a restriction requirement of who may access the first menu item through an administrator interface for the administrator account for the first social network page. The administrator interface for the administrator account of the social network page may be used to approve or disapprove other user account's modification of the first menu item, such as an uploading of the profile picture.

The method 800 also includes a method step 806 of receiving a user interaction through a web server, the user interaction between the first menu item and a social object in a social graph of a user account. The method 800 then includes a method step of 808 of determining a relevancy score between the first menu item and the user account based on the user interaction. This way, the relevancy score is increased when a friend account of the user account has interacted with the first menu item. Determining the relevancy score can include determining whether the user account has interacted with a second menu item of an item type shared by the first menu item. Having interacted with the same item type, the first menu item is more relevant to the user account. The method step 808 can include increasing the relevancy score when the first social network page is a paid sponsor. Other factors in determining the relevancy score can include a proximity of the business entity of the social network page from a residence location of the user account, an association strength of the social object to the user account, a self-described item preference of the user account, or a predicted item preference of the user account determined by the social networking computer system.

Upon determining the relevancy score, the method 800 includes a method step 810 of selecting the first menu item for presentation to the user account based on the relevancy score. The presentation can include a news story feed to the user account or an advertisement to the user account.

The method 800 can also include a method step 812 of removing the first menu item from the social menu. For example, the method step 812 can include receiving a mark-as-spam indication on the first menu item from the user account and tallying the mark-as-spam indication to determine whether to remove the first menu item from the social menu. The method 812 can include removing the first menu item as spam based on a number of positive user interactions with the first menu item over a pre-defined time period. In one embodiment, if the number of positive user interactions is below a threshold, then the first menu item is removed.

Figure 9:
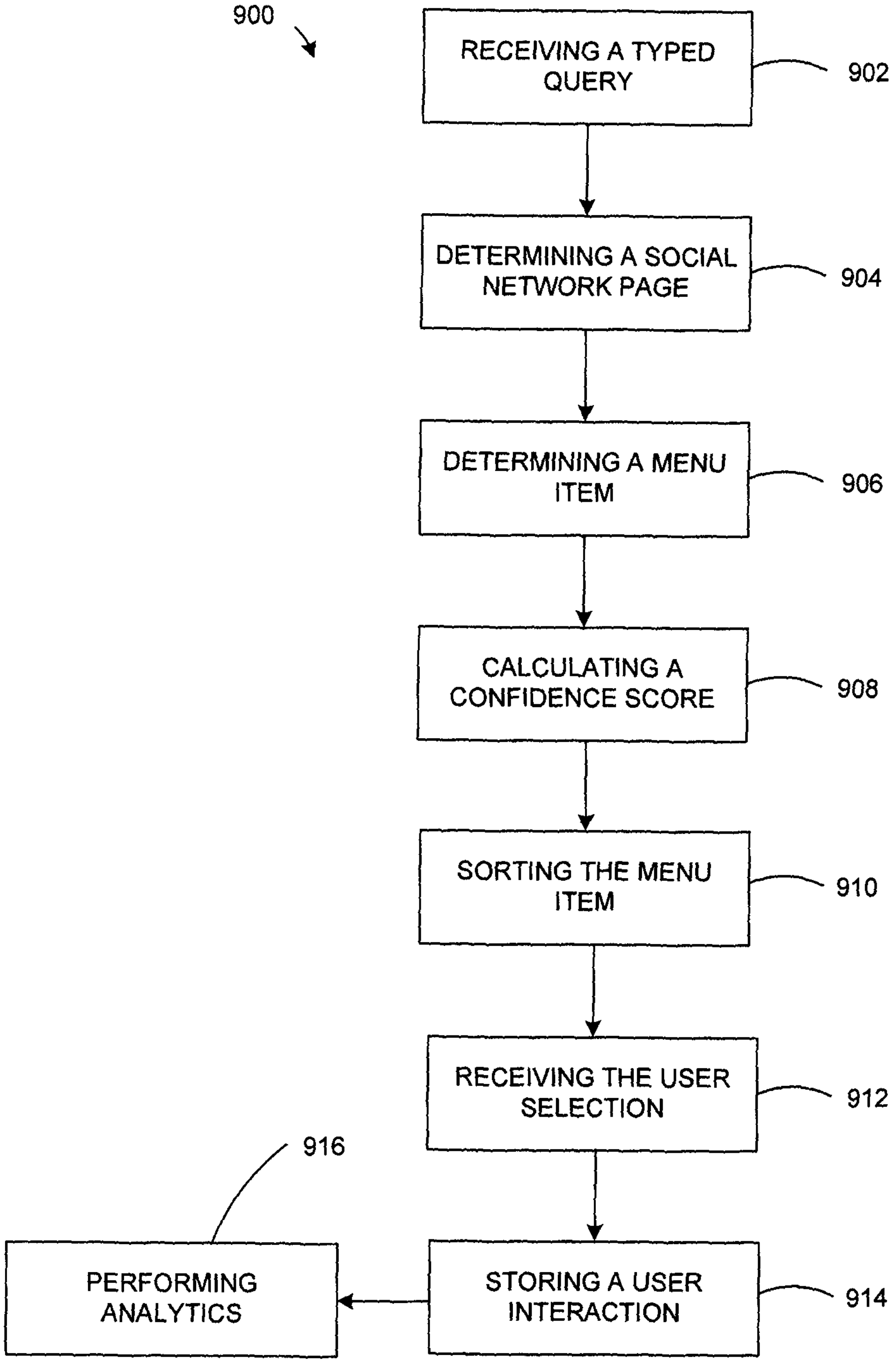
FIG. 9 is a flow chart of a method of operating a social networking system in yet another embodiment.

Referring now to FIG. 9, therein is shown is a flow chart of a method 900 of operating a social networking system, such as the social networking system 100 of FIG. 1 or the social networking system 202 of FIG. 2, in yet another embodiment. The method 900 includes a method step 902 of receiving a typed query from a first user account through a web server. For example, the typed query can be captured through the type-ahead module 314 of FIG. 3 or the type-ahead module 428 of FIG. 4. Receiving the typed query can be in response to the first user account checking into a place/location page.

The method 900 then includes a method step 904 of determining a social network page in a social networking computer system relevant for the first user account based on an account profile of the first user account. Once the social network page is determined, the method 900 includes a method step 906 of determining a menu item of a social menu of the social network page from the typed query to facilitate a user selection from the social menu of the social network page. The menu item can be display in a list with other potential menu items that potentially matches the intended menu item based on the typed query. In at least one embodiment, the menu item can be determined based on the typed query, but is not listed on the social network page or the social menu.

The method 900 can include a method step 908 of calculating a confidence score of the menu item based on a recorded interaction history with the menu item in the social networking computer system. Then the method 900 can include a method step 910 of sorting the menu item to facilitate the user selection from the social menu based on the confidence score of the menu item.

The method 900 further includes receiving the user selection of the menu item through the web server in a method step 912. The method step 912 can include receiving the user selection of a specific variant of the menu item. For example, the specific variant can include difference in color, size, meat-type, style, device-type, or any combination thereof.

Upon receiving the user selection, the method 900 includes a method step 914 of storing a user interaction with a reference link to the menu item on the social networking computer system, the reference link to be referenced by a second user account. Storing the user interaction with the reference link can be part of sharing the reference link in a communication in the social networking computer system, listing the reference link as part of an account profile of the first user account, or using the reference link to tag an uploaded multimedia file or saved communication on the social networking computer system. The reference link can also be part of an announcement on the social networking computer system.

The user interaction stored includes the first user account claiming or directly interacting with the menu item, such as purchasing, reserving, renting, watching, downloading, installing, bidding, or any combination thereof. For reservation, claiming of the menu item can be part of reserving a spot with the social network page, where a reference to the menu item is included in the reservation.

The method 900 can further include a method step 916 of performing analytics on the menu item. The method step 916 can include providing menu item analytics on an administrator account interface. The menu item analytics include a recorded interaction history between user accounts, such as the user accounts 114 of FIG. 1, and the menu item. The menu item analytics can provide an administrator account of the social network page with valuable feedback information about the social menu or the menu item, such as a number of tags, a number of references made, a number of claims made, or any combination thereof. The method step 916 can also include generating a similar-item sub-menu on the social network page for the user account based on the menu item. The similar-item sub-menu can be the similar item sub-menu 730 of FIG. 7.

Figure 10:
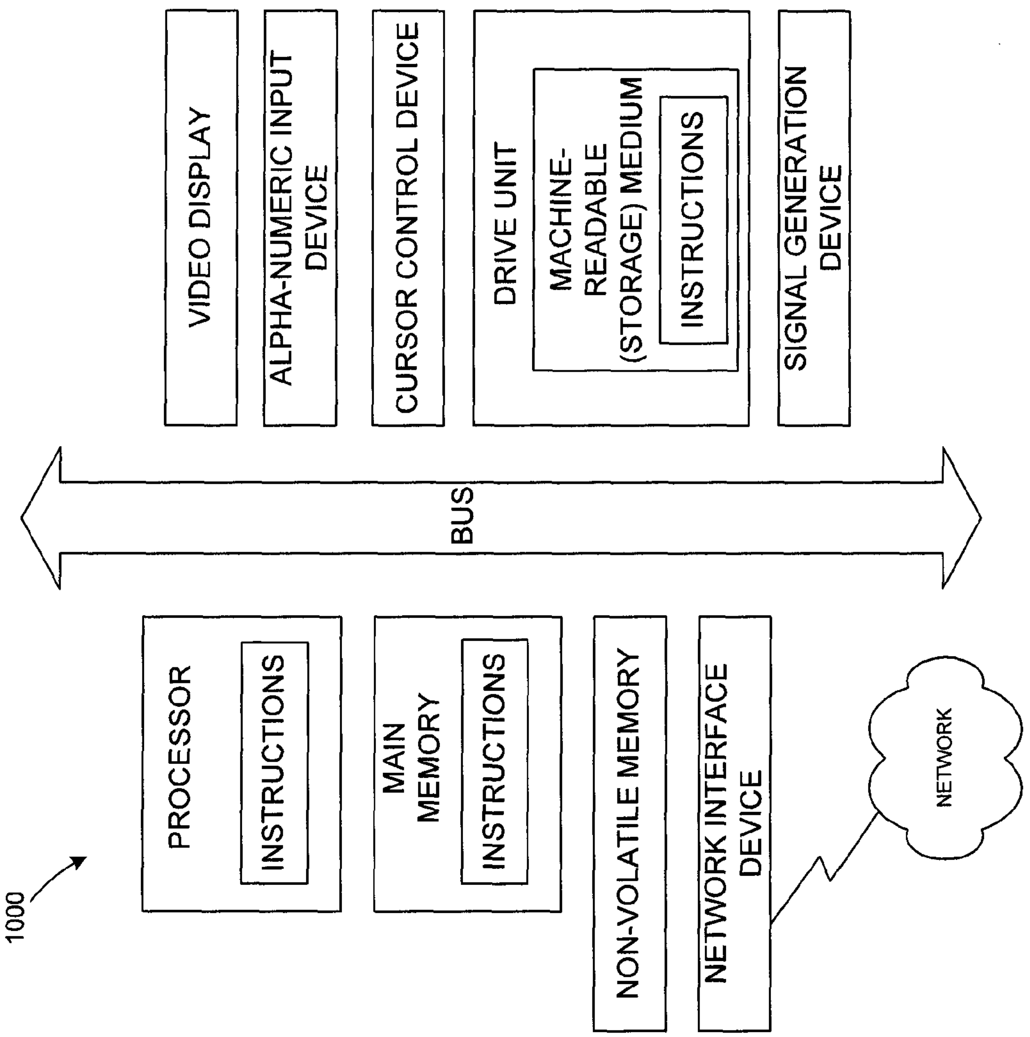
FIG. 10 is a diagrammatic representation of a machine in the example form of a computer system within which a set of instructions, for causing the machine to perform any one or more of the methodologies or modules discussed herein, may be executed.

Referring now to FIG. 10, therein is shown a diagrammatic representation of a machine in the example form of a computer system 1000 within which a set of instructions, for causing the machine to perform any one or more of the methodologies or modules discussed herein, may be executed.

In the example of FIG. 10, the computer system 1000 includes a processor, memory, non-volatile memory, and an interface device. Various common components (e.g., cache memory) are omitted for illustrative simplicity. The computer system 1000 is intended to illustrate a hardware device on which any of the components depicted in the example of FIGS. 1-3 (and any other components described in this specification) can be implemented. The computer system 1000 can be of any applicable known or convenient type. The components of the computer system 1000 can be coupled together via a bus or through some other known or convenient device.

This disclosure contemplates the computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory, is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1000. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative embodiments may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. §112, ¶6 will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:

defining, via an administrator interface accessible to an administrator user account of a social network page of a social networking computer system, a menu in the social network page, an item type for at least a menu item in the menu, and a custom action type associated with the menu for enabling a custom interaction between a user and the menu item, wherein the social network page is associated with a non-user entity, and wherein the menu and the social network page are separately represented as social object nodes in a social graph of the social networking computer system;

wherein the menu is a content structure for organizing a listing of one or more menu items that are offered by the non-user entity and are associated with the social network page in the social graph;

storing, via a web server, a user interaction as a social graph edge of the custom action type between a menu item node representative of a first menu item in the menu and a user node representative of a user account in the social graph;

determining a relevancy score between the first menu item and the user account based on the social graph; and selecting the first menu item for presentation to the user account based on the relevancy score, wherein the social network page is a first social network page, wherein generating the menu includes sharing the menu with a second social network page that also offers the menu items, and wherein the menu is shared such that social graph edges representative of user interactions with the menu item node, via the first social network page and the second social network page, are tracked in the social graph to preserve social context specific to the menu and shared among the first social network page and the second social network page.

2. The method of claim 1, wherein generating the menu includes:

importing a database including a business offering list of the non-user entity;

determining a correspondence between the non-user entity and the social network page; and generating the menu from the business offering list.

3. The method of claim 1, further comprising: modifying an accessibility of the first menu item by receiving a restriction requirement of who may access the first menu item through an administrator interface for an administrator account for the social network page.

4. The method of claim 1, further comprising: modifying the menu by merging a second menu item with the first menu item.

5. The method of claim 1, wherein generating the menu requires uploading a multimedia file as a profile picture of the first menu item.

6. The method of claim 1, further comprising:

receiving a mark-as-spam indication on the first menu item from the user account; and tallying the mark-as-spam indication to determine whether to remove the first menu item from the menu.

7. The method of claim 1, wherein determining the relevancy score includes determining whether the user account has interacted with a second menu item of an item type shared by the first menu item.

8. The method of claim 1, wherein generating the menu includes activating the menu from hibernation, wherein the hibernation prevented the menu from being accessed in the social networking computer system.

9. The method of claim 1, wherein determining the relevancy score includes increasing the relevancy score when the social network page is a paid sponsor.

10. The method of claim 1, wherein generating the menu includes:

receiving an item interaction with the first menu item; and adding the first menu item to the menu based on the item interaction.

11. The method of claim 10, further comprising:

receiving a crowd-based user interaction with the social network page from a user account; and querying the user account to specify the custom action type to associate with the first menu item.

12. The method of claim 1, further comprising:

removing the first menu item as spam based on a number of positive user interactions with the first menu item over a pre-defined time period.

13. A method, comprising:

receiving a typed query from a first user account through a web server;

determining a social network page in a social networking computer system relevant for the first user account based on an account profile of the first user account, wherein the social network page is associated with a non-user entity and wherein the social network page is configured and managed by an administrator account of the non-user entity;

determining a menu item of a menu of the social network page from the typed query to facilitate a user selection from the menu of the social network page, wherein the menu is a content structure for organizing a listing of one or more menu items that are representative of specific items offered by the non-user entity and are associated with the social network page in a social graph of the social networking computer system, wherein a custom action type associated with the menu is defined by the administrator account to thereby enable a custom interaction between a user and at least one of the menu items, and wherein the menu and the social network page are separately represented as different social object nodes in the social graph;

receiving the user selection of the menu item through the web server; and storing a user interaction as a social graph edge of the custom action type between a menu item node representative of the menu item and a user node representative of a second user account in the social graph of the social networking computer system, wherein the social network page is a first social network page, wherein generating the menu includes sharing the menu with a second social network page that also offers the menu items, and wherein the menu is shared such that social graph edges representative of user interactions with the menu item node, via the first social network page and the second social network page, are tracked in the social graph to preserve social context specific to the menu and shared among the first social network page and the second social network page.

14. The method of claim 13, wherein the menu item is a secret menu item that is not presented on the social network page.

15. The method of claim 13, wherein receiving the user selection includes receiving the user selection of a specific variant of the menu item.

16. The method of claim 13, further comprising:

calculating a confidence score of the menu item based on a recorded interaction history with the menu item in the social networking computer system; and sorting the menu item to facilitate the user selection from the menu based on the confidence score of the menu item.

17. The method of claim 13, further comprising: providing menu item analytics on an administrator account interface including a recorded interaction history of the menu item in the social networking computer system.

18. The method of claim 13, further comprising: generating a similar-item sub-menu on the social network page for the first user account based on the menu item.

19. A social networking computer system, comprising:

a processor;

a non-transitory memory;

a menu composer module configured to:

define, via an administrator interface accessible to an administrator user account of a social network page of a social networking computer system, a menu in the social network page, wherein the social network page is associated with a non-user entity, and wherein the menu and the social network page are separately represented as social object nodes in a social graph of the social networking computer system; and wherein the menu is a content structure for organizing a listing of one or more menu items that are offered by the non-user entity and are associated with the social network page in the social graph, and wherein the menu composer module is configured to define a custom action type associated with the menu for enabling a custom interaction between a user and at least one of the menu items;

an action logger configured to store, via a web server, a user interaction as a social graph edge of the custom action type between a menu item node representative of a first menu item in the menu and a user node representative of a user account in the social graph; and a menu interaction module configured to:

determine a relevancy score between the first menu item and the user account based on the user interaction; and select the first menu item for presentation to the user account based on the relevancy score;

wherein the action logger, the menu composer module, and the menu interaction module are implemented as instructions stored in the non-transitory memory and wherein the instructions are executable by the processor, wherein the social network page is a first social network page, wherein generating the menu includes sharing the menu with a second social network page that also offers the menu items, and wherein the menu is shared such that social graph edges representative of user interactions with the menu item node, via the first social network page and the second social network page, are tracked in the social graph to preserve social context specific to the menu and shared among the first social network page and the second social network page.

* * * * *